(12) United States Patent
Hansen

(10) Patent No.: US 10,552,653 B2
(45) Date of Patent: *Feb. 4, 2020

(54) EVENT TIMING SYSTEM AND METHOD HAVING INTEGRATED PARTICIPANT EVENT LOCATION TRACKING

(71) Applicant: Innovative Timing Systems, LLC, St. Louis, MO (US)

(72) Inventor: Kurt S. Hansen, Chesterfield, MO (US)

(73) Assignee: Innovative Timing Systems, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,025

(22) Filed: Jun. 7, 2019

(65) Prior Publication Data

US 2019/0294837 A1    Sep. 26, 2019

Related U.S. Application Data

(63) Continuation of application No. 16/050,057, filed on Jul. 31, 2018, now Pat. No. 10,318,773, which is a
(Continued)

(51) Int. Cl.
  *G06K 7/10* (2006.01)
  *H04N 1/00* (2006.01)
  (Continued)

(52) U.S. Cl.
  CPC ........ *G06K 7/10415* (2013.01); *G01S 5/0294* (2013.01); *G01S 13/878* (2013.01);
  (Continued)

(58) Field of Classification Search
  None
  See application file for complete search history.

(56) References Cited

U.S. PATENT DOCUMENTS

| 4,142,680 A | 3/1979 | Oswald et al. |
| 4,505,595 A | 3/1985 | Rose et al. |

(Continued)

FOREIGN PATENT DOCUMENTS

| EP | 2009595 A | 12/2008 |
| JP | 2003-327331 A | 11/2003 |

(Continued)

OTHER PUBLICATIONS

PCT Search Report, PCT US 2010-022559, dated Jan. 29, 2010.
(Continued)

*Primary Examiner* — Chico A Foxx
(74) *Attorney, Agent, or Firm* — Stinson LLP

(57) ABSTRACT

A system and method for determining and tracking a location of a participant traveling along a route wherein the participant being tracked with a radio frequency tag using a radio frequency tag reader and a timing system, the system includes a location device associated with the tag and has a location data receiver for receiving location information from a location providing source, and a wireless communication interface and time stamps each received location information, and transmits tag location data over the wireless interface, and a location detection device that is in wireless communication with the location device receives the transmitted tag location data, and transmits the received location data to the timing system, with the timing system associating the received location data with the tag number as provided by the tag reader provided tag reads of the tag associated with the location device.

20 Claims, 7 Drawing Sheets

Related U.S. Application Data continuation of application No. 15/343,594, filed on Nov. 4, 2016, now Pat. No. 10,049,243, which is a continuation of application No. 13/980,545, filed as application No. PCT/US2012/022132 on Jan. 20, 2012, now Pat. No. 9,489,552.

(60) Provisional application No. 61/434,782, filed on Jan. 20, 2011.

(51) Int. Cl.

| | |
|---|---|
| H04W 4/80 | (2018.01) |
| G06K 9/00 | (2006.01) |
| G07C 1/22 | (2006.01) |
| H04N 7/18 | (2006.01) |
| H04L 12/18 | (2006.01) |
| H04N 5/232 | (2006.01) |
| G06Q 50/10 | (2012.01) |
| H04Q 9/00 | (2006.01) |
| G06K 19/077 | (2006.01) |
| G01S 13/87 | (2006.01) |
| G01S 5/02 | (2010.01) |

(52) U.S. Cl.
CPC ..... *G06K 7/10376* (2013.01); *G06K 9/00369* (2013.01); *G06K 19/07758* (2013.01); *G06Q 50/10* (2013.01); *G07C 1/22* (2013.01); *H04L 12/1813* (2013.01); *H04N 1/00164* (2013.01); *H04N 1/00185* (2013.01); *H04N 5/23206* (2013.01); *H04N 7/183* (2013.01); *H04N 7/188* (2013.01); *H04Q 9/00* (2013.01); *H04W 4/80* (2018.02); *H04Q 2209/47* (2013.01)

(56) References Cited

U.S. PATENT DOCUMENTS

| | | | |
|---|---|---|---|
| 4,812,845 A | 3/1989 | Yamada et al. | |
| 4,918,630 A | 4/1990 | Plouff et al. | |
| 5,091,895 A | 2/1992 | Chatwin et al. | |
| 5,140,307 A | 8/1992 | Rebetez et al. | |
| 5,436,611 A | 7/1995 | Arlinghaus, Jr. | |
| 5,493,805 A | 2/1996 | Penuela et al. | |
| 5,511,045 A | 4/1996 | Sasaki et al. | |
| 5,604,485 A | 2/1997 | Lauro et al. | |
| 5,696,481 A | 12/1997 | Pejas et al. | |
| 5,812,049 A | 9/1998 | Uzi | |
| 5,821,902 A | 10/1998 | Keen | |
| 5,883,582 A | 3/1999 | Bowers et al. | |
| 5,973,598 A | 10/1999 | Beigel | |
| 6,008,773 A | 12/1999 | Matsuoka et al. | |
| 6,100,804 A | 8/2000 | Brady et al. | |
| 6,204,813 B1 | 3/2001 | Wadell et al. | |
| 6,278,413 B1 | 8/2001 | Hugh et al. | |
| 6,340,932 B1 | 1/2002 | Rodgers et al. | |
| 6,369,697 B1 | 4/2002 | Poole | |
| 6,466,178 B1 | 10/2002 | Muterspaugh | |
| 6,496,806 B1 | 12/2002 | Horwitz et al. | |
| 6,509,830 B1* | 1/2003 | Elliott | H04W 64/00 340/286.02 |
| 6,512,478 B1 | 1/2003 | Chien | |
| 6,570,487 B1 | 5/2003 | Steeves | |
| 6,577,238 B1 | 6/2003 | Whitesmith et al. | |
| 6,696,954 B2 | 2/2004 | Chung | |
| 6,703,935 B1 | 3/2004 | Chung et al. | |
| 6,710,713 B1 | 3/2004 | Russo | |
| 6,720,930 B2 | 4/2004 | Johnson et al. | |
| 6,812,824 B1 | 11/2004 | Goldinger et al. | |
| 6,839,027 B2 | 1/2005 | Krumm et al. | |
| 6,888,459 B2 | 5/2005 | Stilp | |
| 6,888,502 B2 | 5/2005 | Beigel et al. | |
| 6,952,157 B1 | 10/2005 | Stewart et al. | |
| 6,963,270 B1 | 11/2005 | Gallagher, III et al. | |
| 6,989,750 B2 | 1/2006 | Shanks et al. | |
| 6,995,655 B2 | 2/2006 | Ertin et al. | |
| 7,009,562 B2 | 3/2006 | Jenabi | |
| 7,019,639 B2 | 3/2006 | Stilp | |
| 7,057,511 B2 | 6/2006 | Shanks et al. | |
| 7,057,975 B2 | 6/2006 | Stobbe | |
| 7,339,478 B2 | 3/2008 | Le | |
| 7,508,739 B2 | 3/2009 | Paes | |
| 7,589,616 B2 | 9/2009 | Klatsmanyi et al. | |
| 7,605,685 B2 | 10/2009 | Stewart et al. | |
| 7,605,689 B2 | 10/2009 | Hein et al. | |
| 7,901,292 B1* | 3/2011 | Uhlir | A63F 13/216 463/39 |
| 8,085,136 B2 | 12/2011 | Stewart et al. | |
| 8,179,233 B2 | 5/2012 | Kia | |
| 9,848,172 B2* | 12/2017 | DeAngelis | A63B 24/0021 |
| 2001/0040895 A1 | 11/2001 | Templin | |
| 2002/0008622 A1 | 1/2002 | Weston et al. | |
| 2002/0008624 A1 | 1/2002 | Paek | |
| 2002/0044057 A1 | 4/2002 | Zirbes | |
| 2002/0044096 A1 | 4/2002 | Chung | |
| 2003/0014678 A1 | 1/2003 | Ozcetin et al. | |
| 2003/0073518 A1 | 4/2003 | Marty et al. | |
| 2003/0163287 A1 | 8/2003 | Vock et al. | |
| 2003/0189484 A1 | 10/2003 | Rust et al. | |
| 2004/0006445 A1 | 1/2004 | Paek | |
| 2005/0093976 A1 | 5/2005 | Valleriano et al. | |
| 2005/0099269 A1 | 5/2005 | Diorio et al. | |
| 2005/0210475 A1 | 9/2005 | Hepworth et al. | |
| 2006/0000420 A1* | 1/2006 | Martin Davies | A01K 11/008 119/174 |
| 2006/0036365 A1 | 2/2006 | Chiayee et al. | |
| 2006/0097847 A1 | 5/2006 | Bervoets et al. | |
| 2006/0097874 A1 | 5/2006 | Salesky et al. | |
| 2006/0103536 A1 | 5/2006 | Kwak et al. | |
| 2006/0176216 A1 | 8/2006 | Hipskind | |
| 2007/0076528 A1 | 4/2007 | Kirby | |
| 2007/0097969 A1 | 5/2007 | Regnier | |
| 2007/0130893 A1* | 6/2007 | Davies | A01K 11/008 54/1 |
| 2007/0182567 A1* | 8/2007 | Stewart | A63B 71/0605 340/572.8 |
| 2007/0252770 A1 | 11/2007 | Kai et al. | |
| 2007/0262871 A1 | 11/2007 | Yamagajo et al. | |
| 2007/0272011 A1 | 11/2007 | Chapa, Jr. et al. | |
| 2008/0018479 A1 | 1/2008 | Hashimoto et al. | |
| 2008/0021676 A1 | 1/2008 | Vock et al. | |
| 2008/0111695 A1 | 5/2008 | Yamagajo et al. | |
| 2008/0139263 A1 | 6/2008 | He et al. | |
| 2008/0143620 A1 | 6/2008 | Khatri | |
| 2008/0165003 A1 | 7/2008 | Graichen et al. | |
| 2008/0246615 A1 | 10/2008 | Duron et al. | |
| 2008/0246616 A1 | 10/2008 | Sakama et al. | |
| 2008/0258917 A1 | 10/2008 | Boyd et al. | |
| 2008/0284654 A1 | 11/2008 | Burnside et al. | |
| 2008/0316032 A1* | 12/2008 | Kia | A63B 24/0075 340/572.1 |
| 2009/0015377 A1 | 1/2009 | Fogg et al. | |
| 2009/0141138 A1* | 6/2009 | DeAngelis | G06F 16/58 348/220.1 |
| 2009/0184806 A1 | 7/2009 | Kia | |
| 2009/0213700 A1 | 8/2009 | Conant | |
| 2009/0231198 A1 | 9/2009 | Walsh et al. | |
| 2009/0284368 A1 | 11/2009 | Case, Jr. | |
| 2010/0019897 A1 | 1/2010 | Stewart et al. | |
| 2010/0051701 A1 | 3/2010 | Ogata et al. | |
| 2010/0079303 A1 | 4/2010 | Chavez et al. | |
| 2010/0088023 A1 | 4/2010 | Werner | |
| 2010/0227659 A1* | 9/2010 | Claver | A63B 71/0616 463/6 |
| 2010/0265801 A1 | 10/2010 | Ehelen et al. | |
| 2010/0271263 A1 | 10/2010 | Moshfeghi | |
| 2010/0295943 A1 | 11/2010 | Cha et al. | |
| 2010/0302910 A1 | 12/2010 | Howell | |
| 2011/0054792 A1 | 3/2011 | McClellan | |
| 2011/0141221 A1 | 6/2011 | Satterlee et al. | |
| 2011/0298583 A1 | 12/2011 | Libby et al. | |
| 2012/0115557 A1 | 5/2012 | Kia | |

(56) References Cited

U.S. PATENT DOCUMENTS

| | | | |
|---|---|---|---|
| 2012/0223145 A1* | 9/2012 | Stewart | G06K 19/04 235/488 |
| 2012/0230240 A1 | 9/2012 | Nebat et al. | |
| 2013/0231760 A1* | 9/2013 | Rosen | G06F 17/40 700/91 |
| 2014/0046990 A1 | 2/2014 | Kmiecik et al. | |
| 2014/0052279 A1 | 2/2014 | Van Rens | |

FOREIGN PATENT DOCUMENTS

| | | |
|---|---|---|
| JP | 2006004065 A | 1/2006 |
| JP | 2006-053655 A | 2/2006 |
| JP | 2008-276353 A | 11/2006 |
| JP | 2008-299535 A | 12/2008 |
| JP | 4394600 A | 10/2009 |
| JP | 2010-088886 A | 4/2010 |
| JP | 2010-202998 A | 9/2010 |
| JP | 2011-002958 A | 1/2011 |
| KR | 10-2002-0008234 A | 1/2002 |
| KR | 10-2002-0065429 A | 8/2002 |
| KR | 10-0438359 B1 | 7/2004 |
| KR | 10-2006-0078335 A | 7/2006 |
| KR | 10-2007-0092982 A | 9/2007 |
| KR | 10-2008-0090269 A | 10/2008 |
| KR | 10-2010-0100500 A | 9/2010 |
| KR | 10-2010-0119271 A | 11/2010 |

OTHER PUBLICATIONS

PCT Search Report, PCT US 2011-026717, dated Mar. 1, 2011.
Electronic Product Code (EPC) Tag Data Standards Version 1.1 Rev. 1.24; EPC Global, Inc. Apr. 1, 2004.
Integration of RFID and Cellular Technologies, UCLA, WINMEC 2004; Karali, Sep. 2004.
Alien Debuts Gen 2 Interrogator, RFID Journal; O'Connor, Aug. 4, 2005.
Antenna Design for UHF RFID Tags: A Review and a Practical Application, IEEE Transactions on Antennas and Propagation, vol. 53, No. 12; Rao and Nikitin, Dec. 2005.
Electronic Product Code (EPC) Radio-Frequency Indentity Protocols Class-1 Generation-2 UHF FRID Protocol for Communications at 860 MHz—960 Mhz, Version 1.0.9; EPC Global, Inc., Jan. 2005.
Electronic Product Code (EPC) Generation 1 Tag Data Standards Version 1.1 Rev.1.27; EPC Global, Inc., May 10, 2005.
UHF Gen 2 System Overview, TI-RFID; Texas Instruments, Mar. 2005.
Trolleyponder/Ecotag RFID Newsletter, No. 51; Trolley Scan Pty Ltd, Jan. 5, 2006.
Tests on Timing Module for Sports Timing; Trolley Scan Pty, Jun. 2004.
New for 2005—BEST Racing now uses DAG chip timing; DAG 2005.
Intermec RFID System Manual; Intermec 2005.
RFID Primer; Alien Technology, 2004.
DAG System Instructions, Version 4; Pygma Lyon (DAG), Jul. 9, 2004.
DAG System Instructions—DAG Triathlon, Version 5; Pygma Lyon (DAG) Jul. 23, 2004.
DAG System—Badgeur V2 Sport Version Datasheet; Pygma Lyon (DAG), Jul. 19, 2004.
Annex 1: Utilization of the Dag Badger System; Pygma Lyon (DAG).
Alien RFID Academy Training Manual; Alien Technology, Sep. 22, 2004.
Alien Advanced RFID Academy; Alien Technology, Mar. 16, 2005.
Reader Interface Guide, V2.1.0; Alien Technology, 2004.
Mobile RFID Reader with Database Wireless Synchronization, S. Sandoval-Reyes, et al, 2nd ICEEE and CIE2005, Mexico City, Sep. 7-9, 2005.
Tag Programming Guide, Nanoscanner Reader v01.02.01, Alien Technology, 2003.
Mitigating the Reader Collision Problem in RFID Networks with Mobile Readers, Shailesh M. Birair and Sridhar Iyer, Indian Institute of Technology, Mumbai, India, 400 076, IEEE, 2005.
PCT Search Report, PCT US 2011-020901 (INIT D532WO), dated Jan. 11, 2011.
PCT Search Report, PCT US 2011-020905 (INTI D533WO), dated Jan. 11, 2011.
PCT Search Report, PCT US 2011-046032 (INTI D534WO), dated Jul. 29, 2011.
PCT Search Report, PCT US 2011-050570 (INTI D679WO), dated Sep. 6, 2011.
PCT Search Report, PCT US 2012-022156 (INTI D796WO), dated Jan. 23, 2012.
PCT Search Report, PCT US 2012-022126 (INTI D795WO), dated Jan. 20, 2012.
PCT Search Report, PCT US 2012-022125(INTI D682WO), dated Jan. 20, 2012.
PCT Search Report, PCT US 2012-022132(INTI D797WO), dated Sep. 14, 2012.

* cited by examiner

EVENT TIMING SYSTEM AND METHOD HAVING INTEGRATED PARTICIPANT EVENT LOCATION TRACKING

CROSS-REFERENCE TO RELATED APPLICATIONS

This application is a continuation of U.S. application Ser. No. 16/050,057 filed Jul. 31, 2018, which issued as U.S. Pat. No. 10,318,773, which is a continuation of U.S. application Ser. No. 15/343,594 filed on Nov. 4, 2016, which issued as U.S. Pat. No. 10,049,243, which is a continuation of U.S. National Stage application Ser. No. 13/980,545 filed on Jul. 18, 2013, which issued as U.S. Pat. No. 9,489,552, which claims priority to International Application No. PCT/US2012/022132 filed Jan. 20, 2012, which claims the benefit of U.S. Provisional Application No. 61/434,782 filed on Jan. 20, 2011, the disclosures of which are incorporated herein by reference.

FIELD

The present disclosure relates to an event timing system and, more specifically, to an event timing system including a location tracking system for tracking the timed participant or object throughout the timed event.

BACKGROUND

The statements in this section merely provide background information related to the present disclosure and may not constitute prior art.

When using an RFID system or similar detection technology system for timing sporting events, it often desirable to track the progress of a participant. In current systems such as those used in marathons, an RFID tag reader is setup at the beginning or starting line, and one or more mid-points was waypoints such as at various distance location along the route of the marathon. Another final RFID tag reader is located at the finish line to provide the determination of the participant's time for traversing the marathon course.

Other systems, not used in current sport timing events, can track a location of an objection by using a GPS receiver that receives geodetic location data from a plurality of orbiting GPS or GIS satellites. These GPS receivers are often used in vehicles and can be handheld, but are not designed or suitable for use in most timed events such as running races. Furthermore, these GPS receivers often know their own location within a certain accuracy, and have been implemented in modern smart phone technology. These smart phones include a GPS receiver and can be program with software programming in an "app" for providing location data via the application to remote systems. However, the carrying and use of smart phones are not practical for use by event participants, especially where harsh conditions or water are present. Furthermore, these smart phones are not adaptable for use by a participant or an event organizer for integration with event timing systems and are themselves not accurate enough to be used for determining a participants event time.

As such, the inventor hereof has identified a need for a timing system having and RFID tag reader capability for identifying each event participant and for determining an accurate determination of the participants time in an event, but also that it would be desirable to obtain location data about each participant so that the progress of each participant can be monitored, tracked and displayed to remote systems such as remote displays.

SUMMARY

The inventor hereof has succeeded at designing systems and methods for capturing timed geographic location data of one or more moving object such as participants along a timed event route or course, associating such location data with each such object or participant, communicating the captured timed geographic location data to a timing system during such an event for monitoring, tracking, reporting and displaying of the location and movement of the object or event in near real time during an event and for having such location data for use after such an event.

According to one aspect, a system is provided for determining and tracking a location of a participant traveling along a route wherein the participant being tracked with an RFID tag during an event. The system includes a tag reader system receiving one or more tag reads from the RFID tag, determining a time for each tag read, identifying the tag number of the RFID tag, and transmitting a tag read message including at least a portion of the received tag reads with the tag number and the determined times. A timing system is configured for receiving and storing the tag read message including the tag number from the tag reader. A location device that is associated with the RFID tag of the participant has a location data receiver for receiving location data from a location providing source, and a wireless communication interface. The location detection device receives location information from the location providing source, time stamps each received location information, and transmits tag location data over the wireless interface. A location detection device that is in at least periodic wireless communication with the location device receives the transmitted tag location data, and transmits the received location data to the timing system. The timing system stores the location data and associates the location data with the RFID tag number as provided by the RFID tag reader from at least one of the tag reads from the tag associated with the location device.

In another aspect, a timing system is provided for determining and tracking a location of a participant traveling along a route wherein the participant being tracked with an RFID tag during an event. The system including a tag reader system having a processor, a memory, a clock, a communication interface for communicating with a timing system, a radio frequency transceiver for wirelessly communicating with the tag for receiving a tag identification unique to the tag, and one or more antenna coupled to the radio frequency transceiver that are positioned at a first monitored point at a first distance from the reference line, the tag reader system transmitting a tag read request and receiving one or more tag reads from the tag, and transmitting over the communication interface a tag read message including at least a portion of the received tag reads; a timing system having a processor, a memory, and a data interface, the timing system receiving and storing the tag read message including the tag identification from the tag reader, determining whether a tag location device is associated with the tag identification, and if so, transmitting a location data request command including the tag identification; the tracked location device having a location data receiver, a processor, a clock and a wireless communication interface, the location detection device receiving location information on a periodic basis from a location providing source and time stamping each receiving or determined location as location data, receiving a request for wirelessly transmitting the location data; and transmitting the location data responsive to the received request; and a location detection device having a processor, a memory, a wireless communication interface for communicating with the tracked location device, and a data communication interface for communicating with the timing system, the location detection system transmitting the request for the location data responsive to receiving a command from the timing system including the tag identification, and receiving the location data from the tracked location device associated with the tag identification, and forwarding the received location data to the timing system, wherein the timing system stores the location data and associated the location data with the tag read message including the tag identification.

In yet another aspect, a method for determining and tracking a location of a participant traveling along a route wherein the participant being tracked with an RFID tag during an event. The method including in a tag reader system the processes of receiving one or more tag reads from the RFID tag, determining a time for each tag read, identifying the tag number of the RFID tag, and transmitting a tag read message including at least a portion of the received tag reads with the tag number and the determined times. The method also including in a timing system, the processes of receiving the tag read messages as transmitted by the tag reader system and storing the tag read message including the tag number from the tag reader. The method including in a location device associated with the RFID tag of the participant, the processes of receiving location data from a location providing source, time stamping each received location information; and transmitting tag location data over the wireless interface. In a location detection device in at least periodic wireless communication with the location device, the processes of receiving the transmitted tag location data; and transmitting the received location data to the timing system. In the timing system, receiving the location data, associating the location data with the RFID tag number as provided by the RFID tag reader from at least one of the tag reads from the tag associated with the location device; and storing the location associated with the RFID tag number.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

It should be understood that throughout the drawings, corresponding reference numerals indicate like or corresponding parts and features.

DETAILED DESCRIPTION

The following description is merely exemplary in nature and is not intended to limit the present disclosure or the disclosure's applications or uses.

Figure 1:
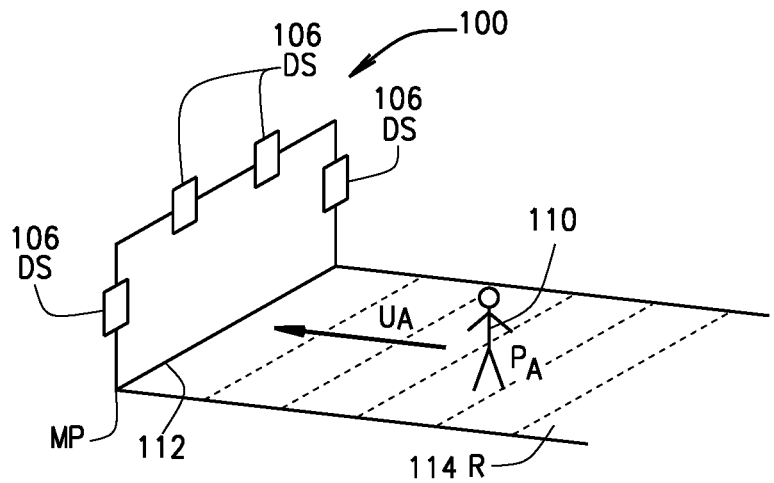
FIG. 1 is a schematic illustration of a typical TS system configuration that is used to read a Race Bib Tag as it passes antennas that are mounted overhead and on the side of a racecourse. The specific location of the antennas could be changed to include any position that is deemed suitable for receiving the Bib Tag signal from the tag according to one exemplary embodiment.
Figure 2:
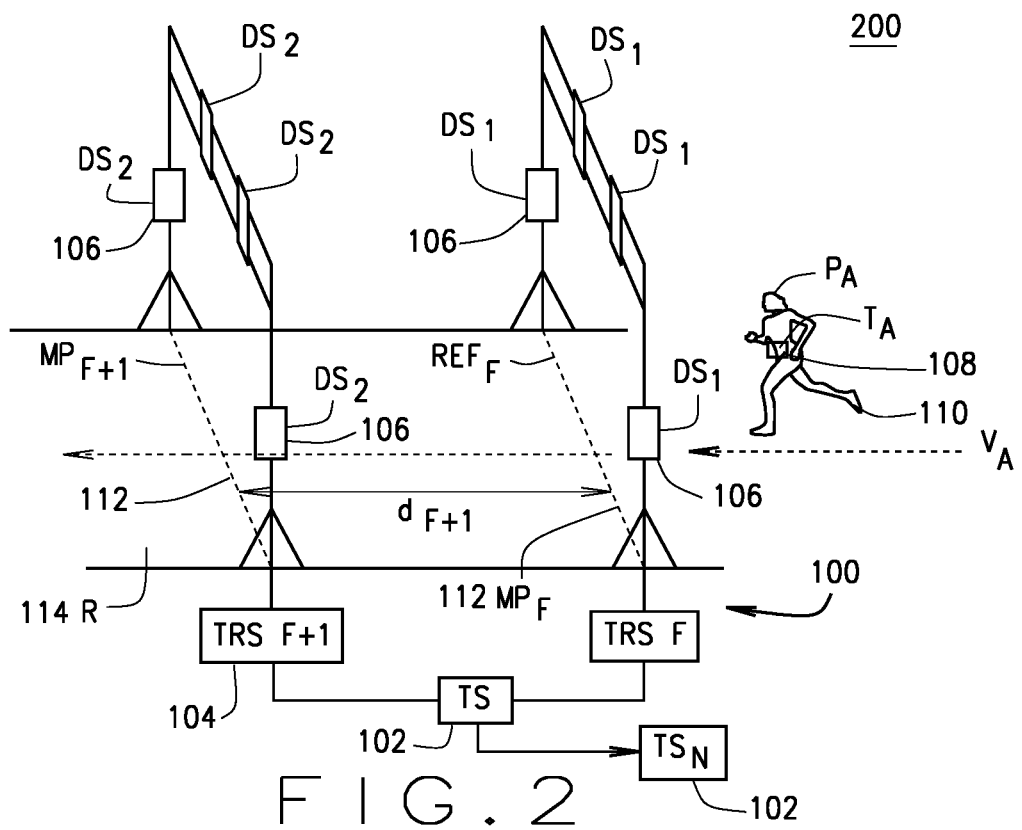
FIG. 2 is a schematic drawing showing a redundant TS Detection System network configuration according to one exemplary embodiment. according to a first exemplary embodiment.

In one embodiment, a system 100 as shown in FIGS. 1 and 2 is provided for determining and tracking a location of a participant 110 traveling along a route R 114 wherein the participant 110 being tracked with an RFID tag 108 during an event. The system 100 includes a tag reader system 104 receiving one or more tag reads from the RFID tag 108, determining a time for each tag read, identifying the tag number of the RFID tag 108, and transmitting a tag read message including at least a portion of the received tag reads with the tag number and the determined times. A timing system 102 is configured for receiving and storing the tag read message including the tag number from the tag reader 104.

Figure 3:
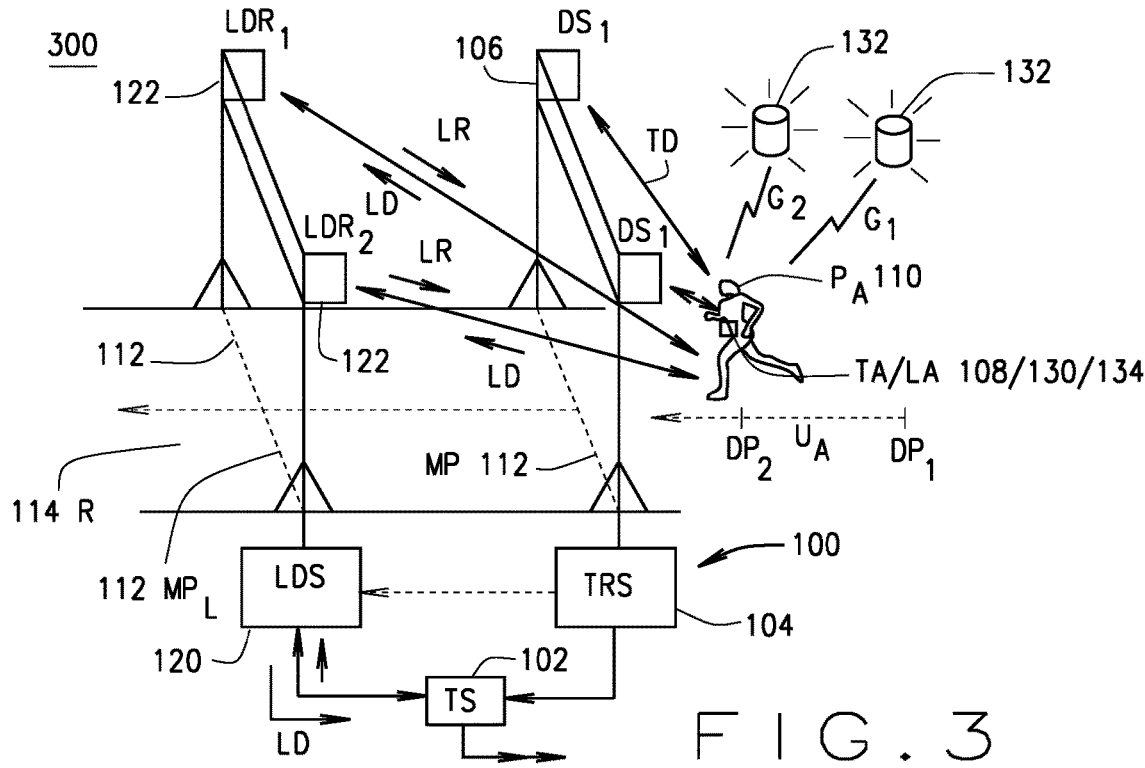
FIG. 3 is a schematic drawing showing a detection point along a racecourse having an RFID tag reader supplemented with a location detection system (LDS), according to one exemplary embodiment.

As shown in FIG. 3, the system 300 can also include a location device 130 that is associated with the RFID tag 108 of the participant 110 has a location data receiver for receiving location data from a location providing source 132, and a wireless communication interface. The location providing source 132 can be one or more of a plurality of GPS satellites 132 and wherein the location data LD is GPS data. The location device 130 can include the RFID tag number of the associated RFID tag 108 for the participant 110 and in some embodiment can be configured for storing location data at intervals based on a predetermined rate.

Figure 9:
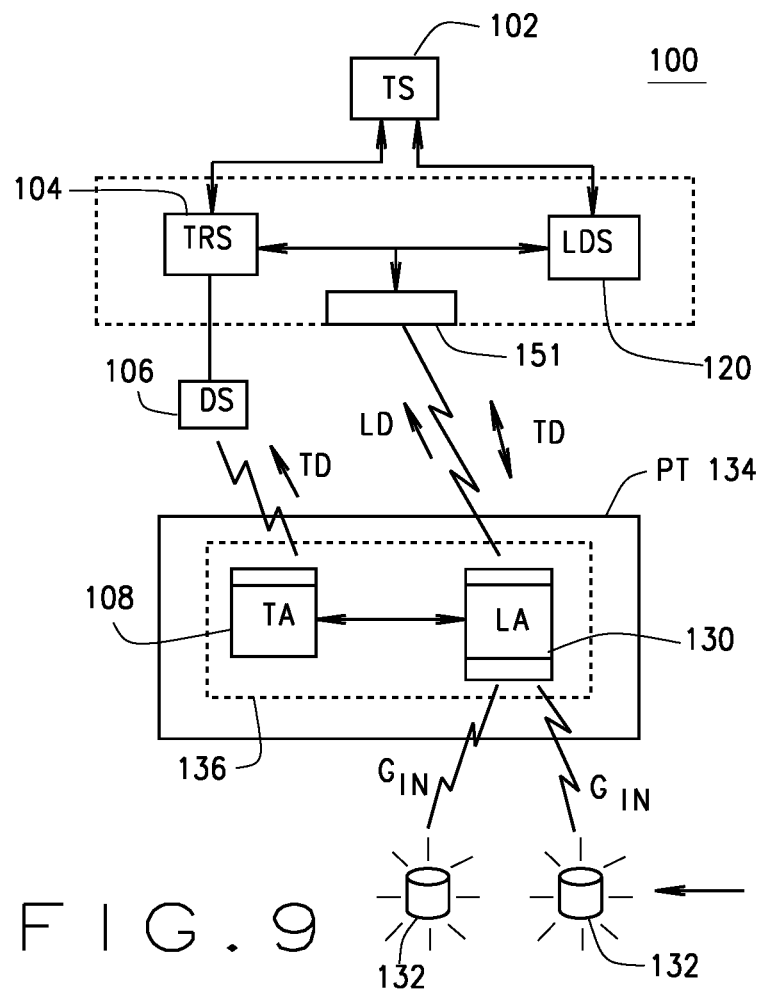
FIG. 9 is a block diagram of a third participant's tag (PT) having a RFID timing chip (TA) with an integrated location detection chip (LA) and a timing system having an integrated RFID tag reader and tag location detection system according to one exemplary embodiment.

The location device 130 can be configured to receive programming instructions for establishing the predetermined rate, and wherein such predetermined rate can be change with the receipt of new programming instructions during an event. As shown in FIG. 9, the location device 130 is communicatively coupled to the RFID tag 108 in the form of a participant tag (PT) 134.

In some embodiments, location device 130 is configured to receive a GPS download request, and wherein the location device 130 transmits the tag location over the wireless interface to a location detection device 122 responsive to said request. For instance, in some cases, at least one of the timing system 102 and the tag reader system 104 detects the proximity of the RFID tag 108 to the RFID tag reader 104 and transmits a location data download command to the location detection system 120, and wherein the location detection device 122 transmits the GPS download request to the location device 130.

In some embodiments, the location detection device 122 only transmits the received location data responsive to the location detection device 122 receiving an input that a transmission to the location detection device 122 is currently available.

The location detection device 122 receives location information from the location providing source, time stamps each received location information, and transmits tag location data over the wireless interface. A location detection device 122 that is in at least periodic wireless communication with the location device 130 receives the transmitted tag location data, and transmits the received location data to the timing system.

The timing system stores the location data and associates the location data with the RFID tag number as provided by the RFID tag reader 104 from at least one of the tag reads from the tag associated with the location device 130.

In some embodiments, the timing system is configured to transmit the location data associated with a particular RFID tag number responsive to a request from a remote system. For instance, a remote system can be configured to request location data from the timing system, receive the requested location data, and to display the location data on a display map of the route 114 indicating the route 114 traveled by the participant or the most recent and current location of the participant. As noted in FIG. 3, the remote system is a Kiosk 170, a website 172, a mobile phone 174, a PC, a tablet 176, a news station, a third party application 178, or a broadcast network 180.

In some embodiments, the location device 130 is configured for selective activation and deactivation of its location data receiver 130, and wherein the wireless interface is configured to receive activation and deactivation commands, and wherein the location detection system 120 is configured for transmitting the activation and deactivation commands responsive to a message received from the timing system 102.

In some embodiments, the location detection system 120 is configured to transmit to the location tag 108 a location data request requesting all or a portion of the location data from the location device 130, and wherein the location device 130 is configured to transmit the location data LD responsive to the location data request.

In some embodiments, the location detection system 120 is configured to transmit a dump all data and then clear all data commands, and wherein the location device 130 is configured to transmit all of the location data and then clear a memory associated with the location device 130.

In another embodiment, a timing system 102 is provided for determining and tracking a location of a participant 110 traveling along a route 114 wherein the participant 110 being tracked with an RFID tag 108 during an event. The system 100 including a tag reader system 104 having a processor, a memory, a clock, a communication interface for communicating with a timing system, a radio frequency transceiver for wirelessly communicating with the tag 108 for receiving a tag identification unique to the tag 108, and one or more antenna 106 coupled to the radio frequency transceiver that are positioned at a first monitored point 112 at a first distance from the reference line, the tag reader system 104 transmitting a tag read request and receiving one or more tag reads from the tag 108, and transmitting over the communication interface a tag read message including at least a portion of the received tag reads; a timing system 102 having a processor, a memory, and a data interface, the timing system 102 receiving and storing the tag read message including the tag identification from the tag reader 104, determining whether a tag location device 130 is associated with the tag identification, and if so, transmitting a location data request command including the tag identification; the tracked location device 130 having a location data receiver, a processor, a clock and a wireless communication interface, the location detection device 122 receiving location information on a periodic basis from a location providing source 132 and time stamping each receiving or determined location as location data LD, receiving a request for wirelessly transmitting the location data LD; and transmitting the location data LD responsive to the received request; and a location detection device 122 having a processor, a memory, a wireless communication interface for communicating with the tracked location device 130, and a data communication interface for communicating with the timing system, the location detection system 120 transmitting the request for the location data LD responsive to receiving a command from the timing system 102 including the tag identification, and receiving the location data LD from the tracked location device 130 associated with the tag identification, and forwarding the received location data LD to the timing system 102, wherein the timing system 102 stores the location data LD and associated the location data LD with the tag read message including the tag identification.

In another embodiment, a method for determining and tracking a location of a participant 110 traveling along a route 114 wherein the participant 110 being tracked with an RFID tag 108 during an event. The method including in a tag reader system 104 the processes of receiving one or more tag reads from the RFID tag 108, determining a time for each tag read, identifying the tag number of the RFID tag 108, and transmitting a tag read message including at least a portion of the received tag reads with the tag number and the determined times. The method also including in a timing system 102, the processes of receiving the tag read messages as transmitted by the tag reader system 104 and storing the tag read message including the tag number from the tag reader 106. The method including in a location device 130 associated with the RFID tag 108 of the participant 110, the processes of receiving location data LD from a location providing source 132, time stamping each received location information; and transmitting tag location data LD over the wireless interface. In a location detection device 122 in at least periodic wireless communication with the location device 130, the processes of receiving the transmitted tag location data; and transmitting the received location data to the timing system. In the timing system, receiving the location data, associating the location data with the RFID tag number as provided by the RFID tag reader 104 from at least one of the tag reads from the tag associated with the location device 130; and storing the location associated with the RFID tag number.

In some embodiments, the location device 130 stores of location data is at intervals based on a predetermined rate. The location device 130 can be programmed to receiving programming instructions for establishing the predetermined rate as well as other data and operations. The predetermined rate can be changed with the receipt of new programming instructions during an event. As another example, the location device 130 can receive GPS download request, and then transmit the tag location over the wireless interface to a location detection device 122 is responsive to said request. In some embodiments, either timing system or the tag reader system uses the RFID tag reads to detect a proximity of the RFID tag 108 to the RFID tag reader 104 and then transmits a location data download command to the location detection system 120. In such embodiments, the location detection device 122 transmits the GPS download request to the location device 130. In some embodiments, the location detection device 122 only transmits responsive to the location detection device 122 receiving an input that a transmission to the location detection device 122 is currently available.

As noted above, where there is a coupled remote system, the remote system can request the location data from the timing system 102 and receiving the requested location data. Once received, the location data LD can be displayed on a display map of the route 114 indicating the route 114 traveled by the participant 110 or the most recent and current location of the participant 110.

In another embodiment, location detection system 120 transmits at least one of an activation and a deactivation command responsive to a message received from the timing system 102 and the location device 130 selectively activates and deactivates the location data receiver 130 responsive to receipt of the message from the location detection system 120.

In another embodiment, the location detection system 120 transmits to the location tag 130 a location data request requesting all or a portion of the location data LD from the location device 130, and the location device 130 transmits the location data LD responsive to the location data request.

In another embodiment, the location detection system 120 transmits a dump all data command and then transmits a clear all data command. In such embodiments, the location device 130 transmits all of the location data LD responsive to the receipt of the dump all data command and clears a memory of all location data LD responsive to receiving the clear all data command.

According to one embodiment, a timing system 102 for determining a time of a passing at a reference line 112 of a tracked tag 134 associated with an object/participant traveling along a route 114 and capturing an image of such passing and integrating the captured image with the determined time for the tracked tag, the system 100 comprising a tag reader system 104, a timing system 102, a tracked location device 134 and a location detection system 120.

In some embodiments, the tag reader system 104 has a processor, a memory, a clock, a communication interface for communicating with a timing system 102, a radio frequency transceiver for wirelessly communicating with the tag 108 for receiving a tag identification unique to the tag 108, and one or more antenna 106 coupled to the radio frequency transceiver that are positioned at a first monitored point at a first distance from the reference line 112, the tag reader system 104 transmitting a tag read request and receiving one or more tag reads from the tag 108, and transmitting over the communication interface a tag read message including at least a portion of the received tag reads.

In some embodiments the timing system 102 has a processor, a memory, and a data interface, the timing system 102 receiving and storing the tag read message including the tag identification from the tag reader 104, determining whether a tag location device 130 is associated with the tag identification, and if so, transmitting a location data request command including the tag identification.

In some embodiments the tracked location device 130 has a location data receiver 122, a processor, a clock and a wireless communication interface, the location detection device 122 receiving location information on a periodic basis from a location providing source 132 and time stamping each receiving or determined location as location data LD, receiving a request for wirelessly transmitting the location data LD; and transmitting the location data LD responsive to the received request. In some embodiments, the location detection device 122 has a processor, a memory, a wireless communication interface for communicating with the tracked location device 130, and a data communication interface for communicating with the timing system 102, the location detection system 120 transmitting the request for the location data LD responsive to receiving a command from the timing system 102 including the tag identification, and receiving the location data LD from the tracked location device 130 associated with the tag identification, and forwarding the received location data LD to the timing system 102, wherein the timing system 102 stores the location data LD and associated the location data LD with the tag read message including the tag identification.

Figure 4:
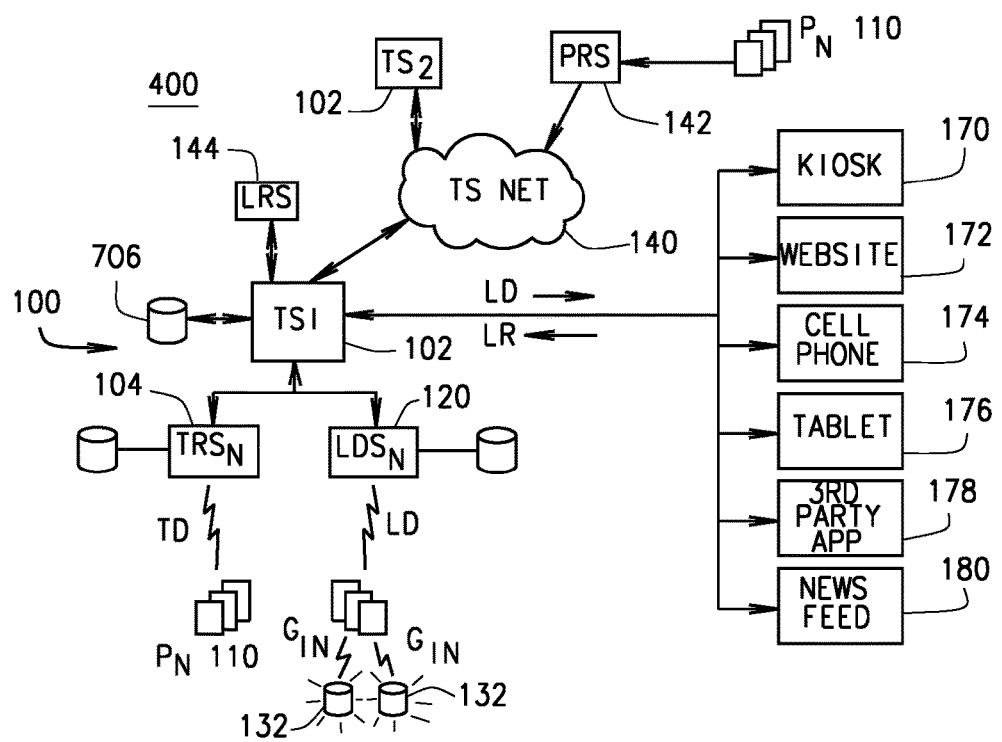
FIG. 4 is schematic block diagram of an architecture and communication system for a timing system (TS) coupled via a timing system communication network (TS NET) for obtaining, storing and processing of participant location data as obtained during an event and the providing of such location data to coupled systems, according to one exemplary embodiment.

The TS LDS 120 enables an object or a participant 110 to wear a small lightweight location tracking device or tracked location device 130 (LA) such a GPS receiver, cellular triangulation receiver, cell phone or the like, while traveling a predetermined course or timed track 114. The TS LDS 120 will store location data points every 1, 5, 10, or 30 seconds as determined by the user. The location data (LD) is collected from up to 8 satellites that the LA receiver 130 may lock onto when the user 110 is wearing the device 130. The LA device 130 has memory that is capable of storing thousands of location data points such that a user could participate in a Marathon or perhaps a Triathlon that lasts for hours. The LA 130 operates on a small battery or other power source or can utilize power conservation as will be described below. As the LA tag 130 for each participant 110 comes within a wireless range of a Location Detection System 120 (LDS) that may or may not be equipped with an RFID tag reader 104 (TRS) for reading the 5 to 10 feet of a TS 102 component such as TRS 104 equipped with a LDS 120, the location data LD is requested or otherwise transmitted from the participants LA tag 130 to the local LDS 120, and subsequently to either the coupled TRS 104 or directly to the TS 102 via the TS NET 140, as shown in FIG. 4. The LA 130 and LDR 122 communicate data and protocol messages, such as described below, via any suitable wireless technology such as Wi-Fi, by way of example, but not intending to be limited thereto. The TRS 104 with LDS 120 or standalone LDS 120 systems can also collect the RFID chip read 108 wherein the LD can be associated with the particular participant 110 and verified as such. However, in addition to the chip read, the TS 102 can collect operating as a data collection point for the GPS tracking information.

Once the LA 130 of the participant 110 has transmitted its location data LD that it has collected during the travel of the participant 110 along the event course R 114, the memory of the LA chip 130 can be retained, marked as sent, or can be cleared. For example, a race even organizer may implement five timing systems 102 along a course R 114 with each positioned or spaced apart around course R 114 for gathering participant location data LD during or apart from RFID tag reads TD. As location data LD is collected by the LDS 120 or TRS 104 with LDS 120 systems, the LD can be transmitted to the responsible TS system 102 for storing and further processing. Display and remote systems coupled to the TS 102, can be provided with the collected LD on a participant basis, during and following the event. For example, during the event, the LD representing the location and progress of a particular participant 110 can be sent from the TS 102 to television screens so that event spectators can see the location and progress of a participant 110 such as by requesting a query from the TS 102. In other cases, a remote system or user can subscribe or request LD for one or more participants 110, so that they can track, monitor, and display the location and progress locally. These remote systems can include, but are not limited to, news and broadcast agencies 180, webpages 172, mobile phones 174 and tablets, or event participant databases 706 that collect participant data for analysis or other purposes.

The presently disclosed system 100 provides a timing system 102 and the user of such system the ability to collect the location data LD on a small device associated with the participant 110, and then wirelessly transmit that location data LD to the location data detection or collection systems (LDS) 120 stations along an event course. In addition, the disclosed communication protocol enables the TS system 102 to receive such participant location data LD, and to provide or make available such location data to users and/or systems desiring such participant location data.

In another embodiment, a Location Tracking device or tracked location tag device (LA) 130 has a GPS or other location receiver (could be cellular triangulation or the like such as a local system) with corresponding first antenna; a process; a memory; computer instructions/software with a database or data storage format; a battery; a housing possibly with an on-off switch, an indicator LED for user visual on or low battery indicator; a second antenna; and a wireless transceiver coupled to the second antenna, and operating at a predetermined wireless operating parameters (frequency, protocol, etc.). The LA 130 regularly receives timing signal, (may be an external GPS/location signal in one embodiment if such were available to this unit), receives/determines a plurality of time stamped location data LD of the participant 110, e.g. TSLD 120 including the LsubNs, time stamps them, and stores them in the memory. Each LA also includes a LA Identification data that is transmitted with each for uniquely identifying the LA and possibly participant data or identification, etc.

In some embodiments, the LDS 120 includes interfaces each having an antenna and a wireless transceiver coupled thereto and being communicative with the LA wireless transceiver (compatible operating parameters). The Interface consistently transmitting a read request for requesting a transmission from any LA 130 within the wireless range of the LT TS Interface. The Interface receiving the data including at least a portion of the TSLD data. Could be all or that which is new since the last read or a clean dump each time. The wireless transceiver is always on for detecting a read request from a LT TS Interface. The LTTSI transmits the received TSLD to a TS 102.

In some embodiment the TS 102 receives the LDS 120 received location data including the LA ID/Participant ID and stores the LD in a memory for each participant. The TS system 102 formats the LD data for each participant 110. The TS system 102 includes an API with a protocol that has a Request LD message that includes a participant ID and can respond with a Provide LD message that includes the TSLD data with the participant ID to the requesting entity.

When a chip is read along the course, we then send out a message to the GPS unit to dump it's memory to us over a packet protocol we have design. The packet is actually quite simple because we don't want much overhead given that the person running by isn't within view for long.

Another exemplary embodiment process/method:

a. RFID Tag/Chip read occurs on the RFID tag by the tag reader detection system (DS). Once this RFID tag is read, the TS 102 determines the tag ID of the object or participant that is approaching the detection point (DP) 112 that is equipped with a LDS 120, such as 50 to 75 feet before the actual DP 112.

b. The TS 102 notifies the LDS 120 of the approaching tag number, and the LDS system 120 communicates with the LA 130 for that approaching participant 110. The window for this can be between 3 to 10 seconds in a typically running timed event where a short-range low power wireless technologies is used for communication between the LDS 120 and the LA 130.

c. The TS LDS 120 issue a request (JGPREQ) to the LA 130 of the object using the tag id in the request. This request can be to have the LA 130 transmit all timed location data points within its memory back to the requesting TS LDS 120.

d. After the TS LDS 120 receives the requested location data from the addressed LA, the TS 102 can send a Clear Memory command to free up the memory in the GPS unit. (JGPCLM) or if on a portion need to be cleared a command with a percent indicator (JGPCLMXX) where XX represents the percentage of memory to clear, starting with the oldest records in memory. This is useful if the operator wants to only clear the first set of records that have been read by perhaps 2 or 3 stations earlier along the course. By having a rolling memory clear, we can ensure that the LA unit 130 is read by multiple stations and we are clearing out the oldest data periodically to make room for the new information being gathered.

A Requesting Entity (RE) is coupled to the TS 102 via a data communications network 140 using a protocol as described herein. The requesting entity can be a Kiosk 170 or an Announcer and the app sends the request and then processes the received Provide TSLD message and data for various uses such as a display on a map of the event, or transmitting such or display on a GUI etc.

Referring to FIG. 3, a schematic drawing showing a detection point 112 along a racecourse 114 having an RFID tag reader 104 supplemented with a location detection system 120 (LDS), according to one exemplary embodiment is illustrated showing the participant 110 with a TA/LA participant tag 134 having the RFID tag 108 (TA) and the location tag LA 130 the location tag LA 130 receives the GN location data from the GPS satellites 132. As the runner PA 110 approaches the monitored point MP 112 having the tag reading system TRS 104 with the RFID device sensors DS1 106, the RFID tag TA 108 of PA 110 is read and the RFID tag number is sent to the TRS 104 and on to the TS 102. Upon receipt of the RFID tag detection and in some cases the receipt of the particular RFID tag number, an instruction is sent to the LDS 120. The LDS 120 transmits a location request message to the location tag LA 130. In reply the LA tag 130 transmits its location data LD to the location data receivers LDR1 122 or LDR2 122 that is associated with the LDS 120. The LDS 120 than transmits the received location data LD to the TS 102. The TS 102 associates the received location data LD with the RFID tag number of the requested read.

FIG. 4 depicts a schematic block diagram of a system 400 having an architecture and communication system for a timing system (TS) 102 having memory 706 with tag reader 104 and location detection system 120 that are communicatively coupled to location satellites 132 are coupled via a timing system communication network (TS NET) 140 for obtaining, storing and processing of participant location data LD as obtained during an event and the providing of such location data LD to coupled systems, according to one exemplary embodiment. In this embodiment, one or more remote systems TS2 102 and participant registration system (PRS) 142 are coupled to the TS 102. Each of these remote systems can send a location data request message and receive the requested location data. Such remote site can also be preorder from a local participant registration system (LRS) 144, as well as a kiosk 170, a website 172, a cell phone 174, a tablet computer 176, a third party application 178 and a news feed 180.

Figure 5:
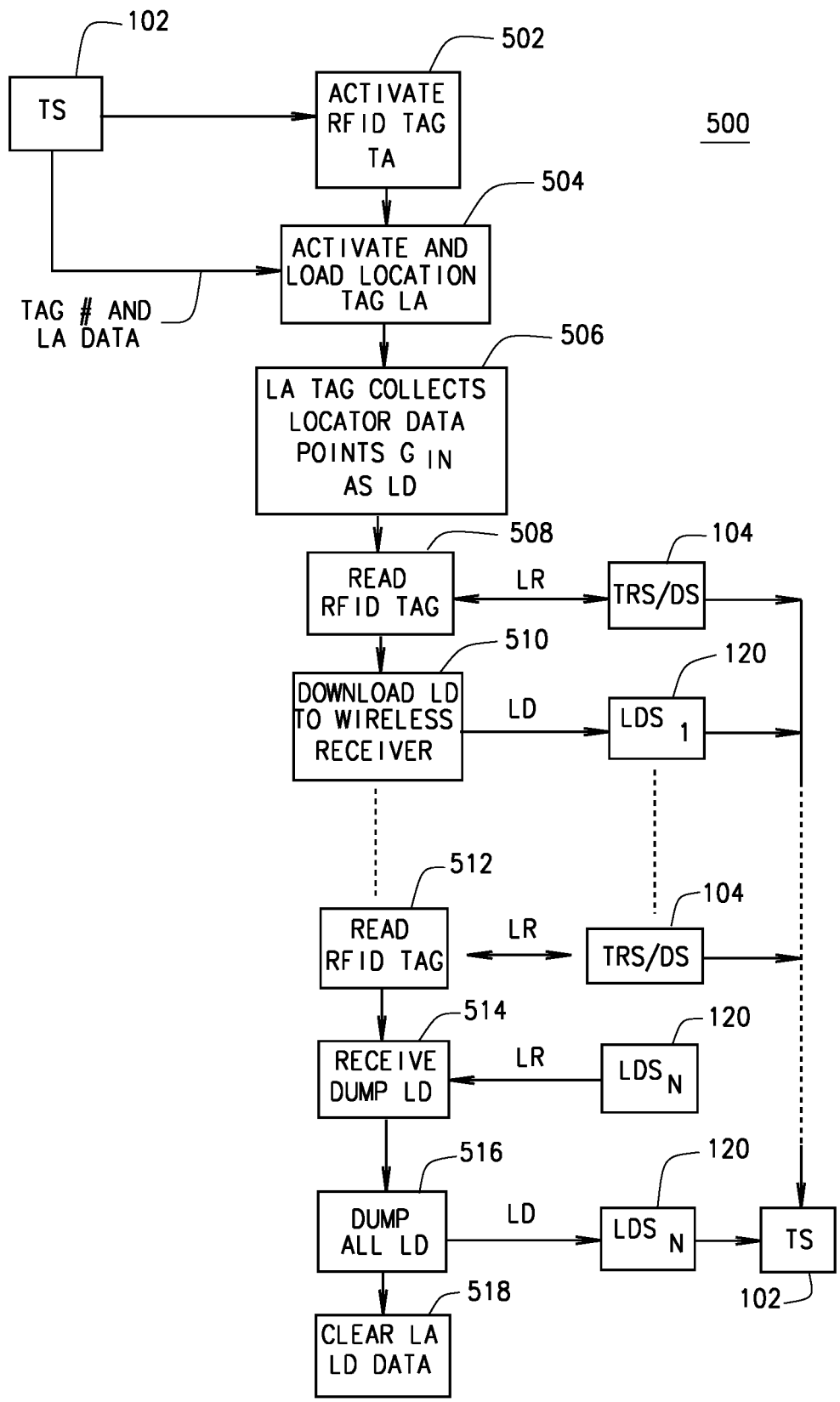
FIG. 5 is a flow chart of a process for integrating a location tag with an RFID tag for a participant in an event and the reading of the RFID tag and the location tag during the event as the participant traverses the event course R at numerous location detection points along course R according to one exemplary embodiment.

Turning to FIG. 5, a flow chart of a process 500 for integrating a location tag 130 with an RFID tag 108 for a participant 110 in an event and the reading of the RFID tag 108 and the location tag 130 during the event as the participant 110 traverses the event course R 114 at numerous location detection points 112 along course R 114 according to one exemplary embodiment is illustrated. As shown in the flow chart, the TS 102 activates the RFID tag 108 in step 502 and then activates the location device 130 in step 504. The Location device 130 LA collects location data in step 506 as the Pa 110 traverses the route 114. In step 508 an RFID reader 104 detects the presence of the RFID tag 108 and notifies the TS 102 and or the LDS 120. The TS 102 or LDS 120 instructs the location detection receiver system 122 to request that the location device 130 provide its current location data. The location device 130 downloads or transmits its location data LD to the TRS 104 in step 510. This process 500 continues as shown as the PA 110 traverses the course with additional RFID tag reads in step 512 and additional receipt of the dumped LD in step 514. At the end, when the PA 100 crosses the finish line 112, the last RFID tag reader 104 sees this and instructs the system 120 to dump all location data in step 516 and clear the location device memory in step 518.

Figure 6:
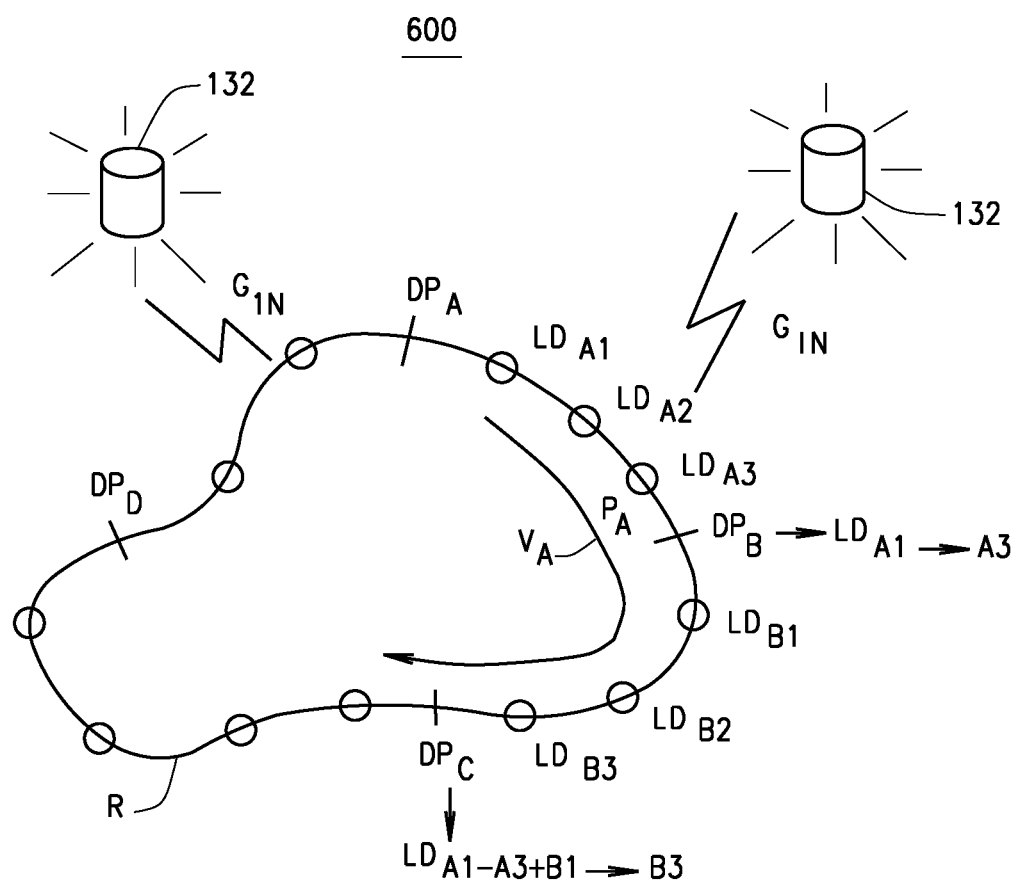
FIG. 6 is an illustration of an event court R wherein multiple location detection points provide for the near real time providing of location data to an integrated RFID tag reading timing system according to one exemplary embodiment.
Figure 7:
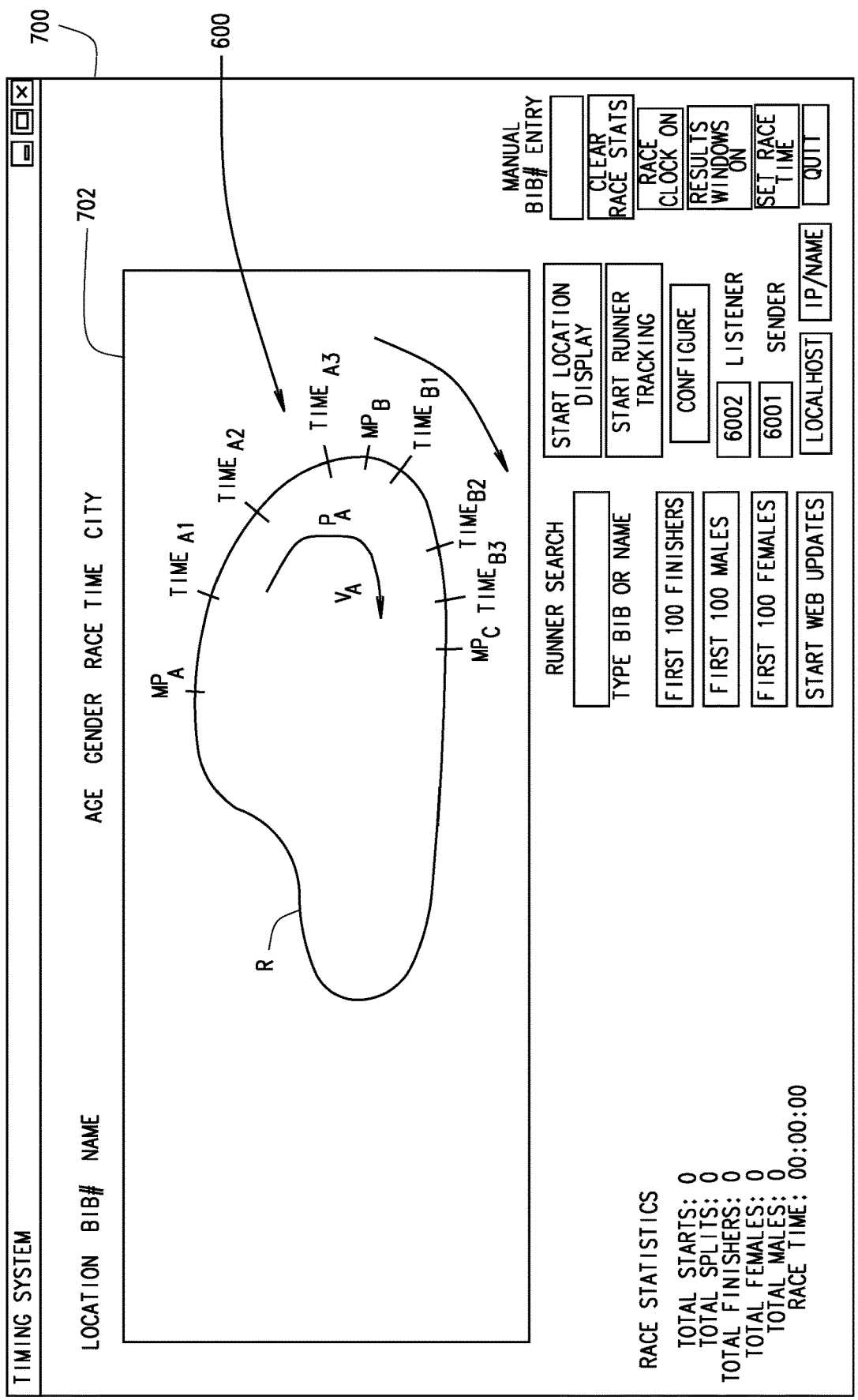
FIG. 7 is an illustration of a webpage display of the of a display system for displaying in near real time the location, monitoring and tracking of a participant in an event according to one exemplary embodiment.

Referring to FIG. 6, an illustration 600 of an event court R wherein multiple location detection points DPN (shown as DPA, DPB, DPC and DPD) provide for the near real time providing of location data LD to an integrated RFID tag 108 reading timing system 102 according to one exemplary embodiment is shown. As shown, as the participant PA 110 traverses the route 114, multiple RFID tag 108 reads result in multiple location downloads from the location device 130, thereby providing the TS 102 with regular updates of the location data LD (shown as LD A1, LD A2, LD A3, LD B1, LD B2, and LD B3), for each monitored RFID tag 108 with a location device 130. FIG. 7 illustrates a webpage display 700 that is a possible remote system website 172 that requested the location data LD as illustrated in FIG. 6. As shown, this displays a graphic image 702 of the illustrated tracking course 600 as in FIG. 6.

Figure 8:
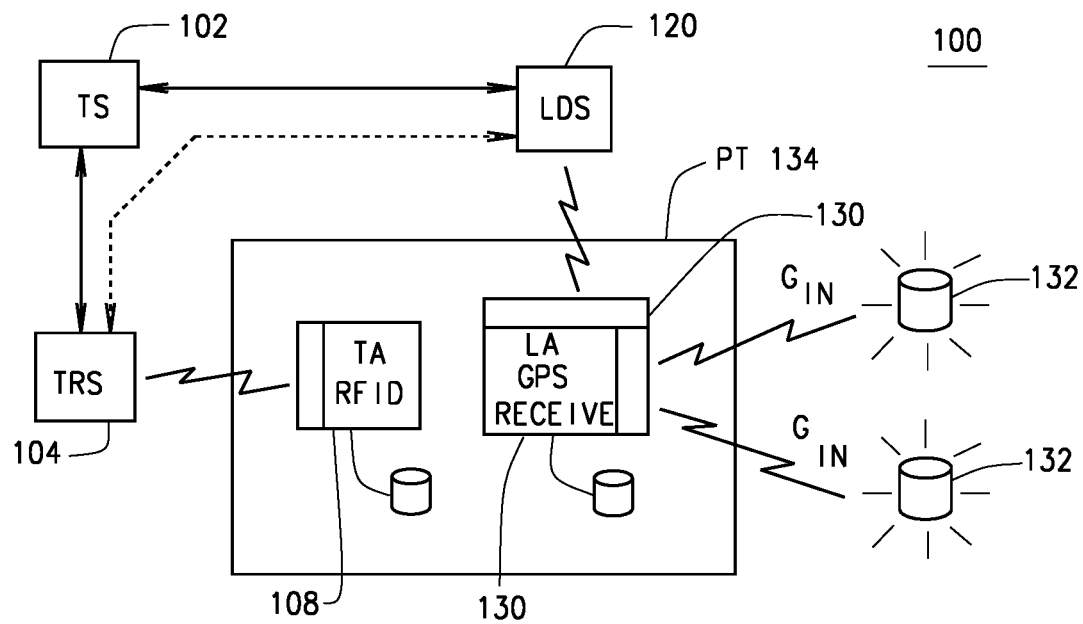
FIG. 8 is a block diagram of a second participant's tag (PT) having an RFID timing chip (TA) and a location detection chip (LA) and the wireless interfaces between the external components of a timing system according to one exemplary embodiment.

Referring now to FIG. 8, a block diagram of the relationship between a participant's tag (PT) 134 having an RFID timing chip (TA) 108 and a location detection chip (LA) 130 and the wireless interfaces between the external components of a timing system 102 according to one exemplary embodiment is shown. As shown here, the TA RFID tag 108 and the location device 130 LA can be separate electronic devices within the participant's tag PT 134.

Turning to FIG. 9, a block diagram of a second participant's tag (PT) 134 having an RFID timing chip (TA) 108 and a location detection chip (LA) 130 and the wireless interfaces between the external components of a timing system according to one exemplary embodiment is depicted. As depicted here, the LA 130 and the TA 108 can be coupled as an integrated assembly 136 to form participants tag 134 as shown.

The TS NET system is suitable for use with the herein described STIIS is an event communication system that provides real-time statistics and event participant information to computing devices, web sites, cellular phones, television displays and monitors, and other types of communication devices. The capabilities of the TS NET system include, but are not limited to the following: (1) interfaces with existing TS timing systems to provide real-time updates of participant information, images and video, on television displays or monitors, (2) provides event clock screens that can show the elapsed event time updated in real-time, (3) provides real-time updates of times on participants at any point on the event course, (4) provides detailed event statistics which are updated in real-time, (5) includes event reports including, but not limited to, total finishers, total males, total females, top 5 male finishers, and top 5 female finishers, (6) provides real-time updates to web sites with event participant results, (7) includes search capabilities for locating individual or groups of participants within an event, (8) provides the ability to generate custom messages for event participants that are displayed as they cross a detection point on the course, (9) includes the ability to generate custom advertising messages that are shown on an event related display such as an event clock, and (10) provides data storage for event results which can be retrieved at any time during the event and (11) location data of the participant with timings at each location.

When using a sport timing system (TS) using an integrated communication system (TS NET) for timing participants in sporting event, the TS NET system and method makes it possible to view updated participant information including, but not limited to, finish times, bib numbers, and participant names on one or more large displays. The TS NET system also displays a real-time event clock display showing elapsed event time. In addition, the TS NET system provides a real-time update screen of event results that can be used by anyone who is providing event updates over a radio or television station, or who is providing updates over a public address system at the event site. The displays supported by the TS NET system include flat-panel television screens or monitors that are placed at a finish line or in an area where participants or spectators can see the results. The information displayed on the screens not only includes participant results, it also includes custom messages for each participant, as well as advertising messages from event sponsors. Messages and screen displays can be customized by the user to utilize various font sizes, font types, colors, and the placement of information on the screens. Furthermore, the user can modify screen images to include custom artwork and logos and that information will also be displayed as event results are being updated on the television screens or monitors. The TS NET system can also update a web site with event results during the event, thus providing a communications tool for publishing event information over the internet.

The TS NET system utilizes a network to receive messages coming from an TS that may have one or more tag reader or participant detection systems associated therewith. For example, an TS-TS NET communication system enables the sharing of participant and event data among systems in support of sport timing ancillary systems and applications. The TS NET system can receive messages from multiple systems. Thus, numerous detection systems can be placed at many locations on an event course and information from those systems can be transmitted over a network connection to the TS NET system. The network interface for the TS NET system can use a connected or disconnected state-less connection, thus allowing guaranteed or non-guaranteed information delivery, such as a TS-TS NET network interface.

As described herein, an TS NET system utilizes a network to receive formatted text messages coming from a sport timing system. There are two primary types of messages that can be used when communicating with the TS NET system. The first type of message provides the event participant information to the TS NET system. The second type of message provides for time synchronization to make sure that the TS NET system is using the same time standard as used by the other TS and TS-TS NET communicating systems at the event. The message format for the TS NET system supports variable length messages that can be customized by the user. The information can be transmitted via numerous technologies including, but not limited to, wired networks, wireless networks, satellite networks, cellular networks, serial networks, or private networks. The messages can be transmitted over any type of network communications protocol including, but not limited to, TCP/IP or UDP, or as generally defined herein by way of example as TS-TS NET.

The TS NET system listens for messages on an IP address and socket number defined by the user in a configuration screen. Once this has been done, the system listens on the designated IP address and socket for inbound messages. When a message is received, it is processed by TS NET. Depending on the configuration of the TS NET system, real-time displays may be formatted and updated with participant or event information. In addition, web site updates may be completed, and reports may be updated, email messages formatted and sent, text messages formatted and sent, and images and videos transmitted and displayed by display devices.

The message type indicator at the beginning of the information packet determines the action taken by the TS NET system. Participant specific messages will contain the ANNC indictor that contains participant data/information. The end of each message or information packet should always contain an end of message delimiter, for example, as described herein an EOM "|" indicator to ensure that the end of packet can be identified by the TS NET system. In addition, the "|" character should be used to indicate the end of each field within the information packet. There are no limits on the length of a field within the information packet. Thus, the system can transmit a significant amount of event and participant information within a single message, and can include image and video links or even files.

While the TS NET system was designed for sporting events, it could be used for any number of other applications that may be associated with multiple detection systems having to work interactively together for a common purpose. Furthermore, while the TS NET system will be described in conjunction with the current embodiments, it will be understood that they are not intended to limit the TS NET system to these embodiments. On the contrary, the current design is intended to cover alternatives, modifications and equivalents, which may be included within the spirit and scope of the TS NET system.

The TS-TS NET interfaces can include a pair mated datagram messages including a requesting and receiving location data.

In yet another embodiment, a method for communicating real-time sporting event and participant announcement information received from a sport timing system (TS), the method including receiving, at an announcement interface system having a processor, a memory, a first data interface communicating over the a stateless packet data communication network with the sport timing system, receiving a multicast datagram location request and read messages including an identification of the sport timing system and participant data including a participant identifier for uniquely identifying each participant in the sporting event and participant timing data. The method also including formatting, in the announcement interface system, the received portion of the participant data into an announcement system message having a predetermined data format. The method further including transmitting, at a second interface of the announcement interface system communicating with an announcement system, the announcement system message including the participant data, the participant identifier, and participant timing data and the participant location data.

The TS-TS NET facilitates and streamlines the communication of tag reader or participant detection system timing information between multiple computers used at sporting events. The protocol is flexible and adaptable and can be used to transmit any type of information across any type of network. The use of variable length messages makes it possible to customize the messages sent or received from any type of device. The protocol is simple and efficient and can be quickly implemented.

The foregoing descriptions of specific embodiments of the present design have been presented for the purposes of illustration and description. They are not intended to be fully exhaustive or to limit the design to the precise use, form, or methods disclosed, and it is obvious that many modifications or variations are possible in the light of the information provided above. The embodiments were chosen, shown, and described in order to best explain the concepts and principles and the practical application of the design, thus providing others skilled in the art the ability to best utilize the design and various embodiments with various modifications as are suited to the particular use desired.

The Timing System (TS) Interactive Communication System and Method (TS-TS NET) as described herein has both text files and network interface files.

TS-TS NET can have text files that a user or TS system developer can access for creating TS-TS NET compatible systems or applications.

In addition, a network interface provides an ability to communicate with an TS system such as TS NET in real-time using TS-TS NET. The file interface is very quick and easy to use. The network interface is much more complex and can require experience in writing network applications. In addition, as described herein one skilled in the art of this TS-TS NET network interface and method requires an understanding of any operating systems environments in which the present TS-TS NET system and method are implemented. As such, it is assumed that any person of skill in the art implementing the present TS-TS NET system and method is well versed in such implementing operation system environment.

TS-TS NET can access multiple TS files that are used within one or more of the multiple TS systems including the Chip or TS Output File and the TS Database File. The file formats documented below are subject to change, so please check with us periodically for updates.

An TS system with a coupled participant detection system monitors a detection point and collects the identification of the detected participant and stamps a time of detection for each participant. These are referred by way of example herein as collecting participant and detection data including detection times, which can be written as participant read information to a text file. As described by way of example herein, a "chip" is a timing chip that is associated with a participant in the sporting event. A chip refers to the detection of at particular participant by a particular detection system. While a chip refers generally to an RFID chip and the reader is an RFID reader, those skilled in the art would understand that the reference to an RFID chip or chip, could be any type of tag reader or participant detection at a detection point and still be within the scope of the present disclosure.

An TS system or a user of such TS system can predetermine the name and location for the TS OUTPUT FILE. This file is updated in real-time by the TS system as the event progresses and it contains the following information: Antenna #,Bib #,Bib #,"Time" The file always uses a delimited format, shown here by example using commas as the delimiters, and the time field can be any format, but is shown in this example as having quote marks.

The exemplary format for the TS OUTPUT FILE is readable by a spreadsheet or many third party programs, but other formats are also possible. An TS system can ignore the Antenna # field for many applications as the Antenna # field is often used internally by an TS for uniquely identifying the actual equipment making the detection. The Bib # field appears twice and this is not an accident. This is repeated in this exemplary embodiment as several third-party programs require this format when importing an event timing data file. The final entry is the time of the chip read which is in the format of "HH:MM:SS" or "HH:MM:SS.XXX." As shown in this later example, the format for chip read times can be expanded to include sub-second timing. TS-TS NET communication systems and methods should properly handle time values that may include tenths, hundreds, or thousandths of a second.

In the TS system, the chip number is generally the same as the bib number worn by the participant. Thus, for an event with perhaps 500 participants, the Bib # field may contain a value from 1 to 500. For larger racing events, the Bib # field can be up to 99999 or even up to 500000 or so depending on the requirements as the TS and TS-TS NET systems will support these expanded field lengths.

The following is a sample of a typical TS-TS NET output file using the HH:MM:SS format:
    0,41,41,"14:27:42"
    0,47,47,"14:27:44"
    0,39,39,"14:27:46"
    0,14,14,"14:27:48"
    0,32,32,"14:27:50"

Each TS is capable of detecting and reading a single chip or participant multiple times as it approaches a timing detection point. Thus, an output file may contain multiple entries for the same chip/participant. The last entry is the final read on a chip. For example, the following output file shows that a single chip was read multiple times as the runner approached the finish line in an event.
    0,32,32,"14:28:20"
    0,32,32,"14:28:21"
    0,32,32,"14:28:22"

In one exemplary embodiment, the output file only contains one entry since most runners can pass through the detection point in one second or less. However, if an event can have a number of walkers, there may easily be 4 to 5 entries for the same timing chip as the walker approaches and goes past the finish line.

As an TS system or detection system reads timing chips, the TS system appends new data to the file and continues to do so during the event. Thus, the file should not be modified or locked while an event or event is ongoing. It's best to read the file once the event is concluded, or while the system is not actively reading timing chips.

Each TS system coupled with a location data system (LDS) can have a high-speed memory with a binary database that runs in the memory and is updated very rapidly when the detection are made such as when chips are being read. When this database is saved to the disk drive, it is written to a text file using a delimited format, such as delimited using commas. When using commas as the delimiters, the file can be read by third-party programs without having to build a complex database interface as such files are common as known to those skilled in the art.

The following is a sample TS DATABASE file record:
    1,Jay_Cooper,08:00:00,08:15:00,00:00:00,00:00:00,00:00:00,08:45:00, 00:45:00,50,Half Marathon,M,Allentown, Team Cooper,50001,Club Member, #76435,137

TS can have the ability to automatically write out the TS DATABASE FILE during an event to a file name selected by the TS user. For example, the TS can be specified to have a file written to the disk every 30, 45, or perhaps 60 seconds. In addition to writing the TS DATABASE FILE to the disk, TS can automatically create multiple files that have a unique file name that is based on the current date and time. By having multiple files on the disk, any of the files can be accessed without a concern about TS accessing those files again once they have been created. For example, an TS system can write the database to the disk every 60 seconds with a unique file name. The TS system can specify the base file name as TSDB.txt. When TS writes the file, it creates a file with the following name format:
    TSDB20090501100502.txt There can be multiple TS DATABASE FILES on the disk drive, and there could be hundreds of files by the time the event completes. Each of these files is essentially a unique snapshot of the event results for that moment in time.

The following is the format for the database file:
    Bib #,Name,StartTime,Split1,Split2,Split3,Split4,FinishTime,ElapsedT ime,Age,Division,Gender,City,TeamName, ChipField,UserField1,UserField2,UniqueID The Bib # field can contain a value from 1 to 99999 depending on the version of the TS system in use.

The Name can contain the full name and is typically formatted as FIRST NAME LAST NAME with no comma between the first and last name, but may be formatted such as using an underscore or the like. In some embodiments, it is undesirable for particular characters, such as a comma, by way of example, not be included in the name field due to their use as a delimiter where applicable. When an TS system loads the database file, it can use particular characters such as a comma to determine the individual fields. Thus, such TS database delineation characters should not be used in the Name field as such usage can cause TS to use the wrong fields for the remaining entries on the line being read.

The following fields all contain a time based on the time of day: Start Time, Split1, Split2, Split3, Split4, Finish Time. All of these fields are in the format HH:MM:SS or HH:MM:SS.XXX and there are no quote marks.

The described format for chip read times can be expanded to include sub-second timing. Any TS-TS NET implementations should be implemented to properly handle time values that may include tenths, hundreds, or thousandths of a second. Following is one exemplary embodiment of a set of applicable TS data fields:

a) The Elapsed Time field is a calculated field which is typically the Finish Time minus the Start Time. This field is in the format HH:MM:SS or HH:MM:SS.XXX and there are no quote marks.

b) The Age field can contain up to 3 digits typically ranging from 1 to 100.

c) The Division field can contain a text entry that can be up to 250 characters in length, although it is typically 20 or less characters long.

d) The Gender field can contain a text entry that can be up to 250 characters in length, although it is typically 1 character with either an M or F entry.

e) The City field can contain a text entry that can be up to 250 characters in length, although it is typically 25 or less characters long.

f) The Team Name field can contain a text entry that can be up to 250 characters in length, although it is typically 25 or less characters long.

g) The Chip field can be used, in some embodiments, to include a text entry that is associated with a particular timing chip. In some embodiments the Chip field can be up to 250 characters in length, although it is expected to be 6 or less characters long.

h) The UserField1 field can contain a text entry that can be up to 250 characters in length, although it is typically 25 or less characters long. This field may be used by the software to contain values related to team order for relay events. In some cases, the TS user can place information in this field related to the TS user's personal information such as emergency contact number.

i) The UserField2 field can contain a text entry that can be up to 250 characters in length, although it is typically 25 or less characters long. This is a second field that often contains additional personal information about an event participant.

j) The UniqueID field can contain a text entry that can be up to 250 characters in length, although it is typically 10 or less characters long. This field is often used to track event-day registration numbers or other unique values that identify an event participant. TS can automatically insert a unique value in this field during the rapid registration process in the software.

Not only can TS write this TS DATABASE FILE text file to the disk drive, it can read it back in from the TS DATABASE FILE. Thus, a TS DATABASE FILE can be created using this format and TS can read it just fine. Any time fields that are created should be in the HH:MM:SS or HH:MM:SS.XXX format with leading zeros on any times that are less than 10. For example, if the time is 9:10 am, the field should contain the entry 09:10:00 or 09:10:00:000. In most cases, when creating a new file that can be loaded into TS, the time fields should contain 00:00:00 or 00:00:00:000. However, if an event has assigned start times, the start times can be loaded into TS by using the StartTime field.

TS can have a state-less network interface such as provided by a user data protocol (UDP) system as used for outbound and inbound messaging over a suitable communication network. The TS-TS NET system utilizes these messages to include outbound packets using TS-TS NET for READ and ANNOUNCE information, as well as other data as described herein. In addition, an TS using TS-TS NET monitors the Internet connection for UDP TS-TS NET messages from other TS-TS NET systems or third-party programs coupled to the same communication network. This interface allows third-party programs to be developed which can work within the TS architecture.

UDP packets as used by the present TS-TS NET system provide a very quick and relatively easy system to implement and from which to build flexible and robust applications. While there are known limitations for UDP packets, the describes application of the UDP packets in the TS-TS NET recognizes these limitations and adjusts the design and applications accordingly whereby UDP provides a very suitable solution for communicating between multiple TS systems.

The following includes the packet structure for all TS-TS NET supported UDP packets. TS-TS NET can be configured to listen and send on any socket ranging from 5000 to 9999. In addition, TS-TS NET can be set to send to a specific computer by using either the computer name or its IP address. Furthermore, TS-TS NET can send to all computers on the network by using 0.255 as the last bytes in the IP address. Of course in other systems and embodiments other broadcast messaging address can also be used and still be within the scope of the present invention. In this example, if the TS-TS NET is set to 192.168.1.255, the TS-TS NET sends messages as Broadcast packets. TS-TS NET message are sent as clear text contained within the UDP packet, with fields separated by the "|" characters. |EOM| should always come at the end of each message.

As noted, the TS-TS NET network interface is configured for stateless broadcast communications systems, such as UDP using a broadcasting IP address indicator such as 255. The networking interface can however support a variety of different types of messages. These can include broadcast messages, multicast messages and unicast messages, between and among various TS-TS NET systems.

Broadcast TS-TS NET messages are transmitted from the TS-TS NET interface over the stateless broadcast communication network with no addressing as to the intended recipient as well as no identification the TS-TS NET system that is sending or sent the message. As such, each of the Broadcast TS-TS NET Messages can be read by any listening TS-TS NET device, and once received by that device, the receiving TS system does not know which other TS system sent the message. As will be discussed, these include, by way of example, the ANNCM and TRSTART messages.

Multicast TS-TS NET messages are transmitted from the TS-TS NET interface over the stateless broadcast communication network with no addressing as to the intended recipient. However, these messages include an identification of the sending TS system, e.g., FROM identifier. These TS-TS NET multicast messages can be read by any TS-TS NET system and once received by that TS system, the receiving TS system knows which of the other communicating TS systems the message originated. These include, by way of example, the ANNC, ANNCL, READ, NOANNC, TSYNC, RSIG, and KREFRESH messages.

Unicast TS-TS NET messages are transmitted from the TS-TS NET interface over the stateless broadcast communication network with an identification of which the sending entity is (FROM identifier) as well as an identification of the intended receiving TS system (DEST or Destination identifier). These unicast TS-TS NET messages are essentially point to point messaging within a stateless broadcast messaging communication system. Only the identified destination TS-TS NET system should receive these messages and they are ignored by all other listening TS system. The receiving TS system knows that the message was intended for its use and it knows the identification of the sending TS. These include, by way of example, the REANNC, RESEND, LOOKUP, STARTRFID, STOPRFID, COMMAND, RQIMAGE, STIMAGE, RQIDIR, STIDIR, RQISTREAMON, and RQISTREAMOFF messages by way of example.

It should be understood to those skilled in the art that other broadcast, multicast and/or unicast messages can also be developed as an application may require or benefit from the present disclosure, and still be considered within the scope of the present disclosure.

Announce Message (ANNC): The ANNC packet is sent by TS-TS NET to the network and can be captured by any device that is listening on the network for UDP packets. The message indicates that TS can have read a chip at the location indicated in the From field.

Packet length=variable size
Total fields=10
ANNC|FROM|BIB#|NAME|AGE|GENDER|CITY|TIME|PACKET#|EOM|

The information in this TS-TS NET packet comes from the TS internal database. The packet # is a unique 3-digit value that begins with 1 and continues to 999, after which it wraps around and starts over at 1. This packet # can be used to ensure that all messages are received. If a message is missing, a request can be made to resent that packet. TS-TS NET maintains a circular buffer of past messages for this purpose.

Announce Message for Lap Events (ANNCL): The ANNCL packet is sent by TS-TS NET to the network and can be captured by any device that is listening on the network for UDP packets. The message indicates that TS can have read a chip at the location indicated in the From field.

Packet length=variable size
Total fields=11
ANNCL|FROM|BIB#|NAME|AGE|GENDER|CITY|TOTALLAPS|TIME|TEAM NAME|PACKET#|EOM|

The information in this TS-TS NET packet comes from the TS internal database. The packet # is a unique 3-digit value that begins with 1 and continues to 999, after which it wraps around and starts over at 1. This packet # can be used to ensure that all messages are received. If a message is missing, a resend of the packet can be requested. TS-TS NET maintains a circular buffer of past messages for this purpose.

Re-Announce Message (REANNC): The REANNC packet is sent by TS-TS NET to request a re-send of a particular packet.

Packet length=variable size
Total fields=5
REANNC|FROM|DEST|PACKET#EOM|

When this TS-TS NET message is used, the packet number should be included as desired from the TS or TS-TS NET buffer. The FROM and DEST fields contain the IP addresses for the two systems.

No Announce Information (NOANNC): The NOANNC packet is sent via the TS-TS NET when a request was made for a packet that is not yet available. For example, if TS-TS NET can only send 100 packets, and a system requests packet number 120, the system will generate the NOANNC message in response.

Packet length=variable size
Total fields=10
NOANNC|FROM|0| |0|M| |00:00:00|Packet #|EOM|

The message returns the requested packet number with the NOANNC header.

Announce Message Information (ANNCM): The ANNCM packet is sent by TS-TS NET or the Kiosk when a new message is received by an input such as is entered by a participant or family member requesting a specific participant's data be displayed on a Kiosk or an Announcer screen.

Packet length=variable size
Total fields=4
ANNCM|BIB #|MESSAGE|EOM|

Read Message (READ): The READ packet is sent by TS-TS NET to the network and can be captured by any device that is listening on the network for UDP packets. The packet is a real-time feed of any reads that are occurring at the particular TS timing system.

Packet length=variable size
Total fields=6
READ|FROM|BIB#|TIME|PACKET #|EOM|

Packet number is a value that begins with 1 and goes to 999. Once it reaches 999, it starts over again at 1. This packet number is used to reference past messages in case a message is lost on the network and a re-send is requested.

Additionally a separate READ message can be used that includes the PARTICIPANTNAME field in lieu of the BIB #.

Resend Message (RESEND): The RESEND message is sent to any TS system requesting that it re-send a past message. If a message is lost over the network, a request to resend can be made for any of the last 999 messages sent previously. TS-TS NET maintains a buffer with the past 999 messages. Once the 999 position is used, TS-TS NET starts over at position 1. Thus, TS-TS NET is maintaining a circular buffer of messages.

Packet length=variable size
Total fields=5
RESEND|FROM|DEST|PACKET #|EOM|

The Destination field is the TS system that should respond to this request. This is the same name set in the TS Defaults for "My Name" in the networking section. If a request is made for a packet number that has not yet been used by TS-TS NET, a packet response starting with the BLANK field can be received.

Time Sync Message (TSYNC): The TSYNC message is sent using TS-TS NET to any TS system that is listening for Time Sync commands. This is typically used by TS Remote to make sure the time on the Remote laptop is the same as that on the TS system. There can always be a slight delay in the network transmission, and as such a 0.25 to 0.5 second delay may be added to the time received using TS-TS NET to compensate for the delay.

Packet length=variable size
Total fields=4
TSYNC|FROM|TIME|EOM|

The FROM field is the name set in the TS Defaults as My Name.

Time Sync Message (TRSTART): The TRSTART message is sent using TS-TS NET to the Kiosk to set the start clock for the event. The start time can be set on a Kiosk using a command in the Configuration screen. However, by sending this packet to the Kiosk, the time can be set remotely from a TS system.

Packet length=variable size
Total fields=4
TSYNC|TIME|EOM|

Remote Signal Message (RSIG): The RSIG message is sent using TS-TS NET to any system that is listening for RSIG command. This is typically used by TS Remote to make sure the connection over the network is good to TS-TS NET and also to verify that TS-TS NET is scanning and listening for remote entries.

Packet length=variable size
Total fields=4
RSIG|FROM|TIME|EOM|

The FROM field is the name set in the TS Defaults as My Name.

Refresh KIOSK Message (KREFRESH): The KREFRESH message is sent using TS-TS NET to any system (typically a Kiosk) that is listening for the KREFRESH command. This is typically used by TS-TS NET to send out all of the results in an event to the Kiosk. This might be useful if the Kiosk re-booted or if the Kiosk was started after results had already occurred in an event.

Packet length=variable size
Total fields=10
KREFRESH|FROM|BIB#|NAME|AGE|GENDER|CITY|TIME|PACKET#|EOM|

The information in this TS-TS NET packet comes from the TS internal database. The packet # is a unique 3-digit value that begins with 1 and continues to 999, after which it wraps around and starts over at 1. This packet # can be used to ensure that all messages are received. If a message is missing, a request that packet be re-sent can be made. TS-TS NET maintains a circular buffer of past messages for this purpose.

Lookup Message (LOOKUP): The LOOKUP message allows a device to request event information from another device. The identifier may be any text. In most cases, the identifier will be a tag serial number, event bib number, participant name, or perhaps a unique identifier that refers to a particular type of information. For example, if a TS systems needs to know the current duration of an event, the LOOKUP message could be sent to a TS system that is responsible for tracking the total event time. The identifier field might contain the text entry "EVENTTIME" and this entry could be used to indicate that the event duration is desired. The packet number field is optional and if not used, the field could contain a single space.

Packet length=variable size
Total fields=6
LOOKUP|FROM|DEST|IDENTIFIER|PACKET#|EOM|

Start RFID Message (StartRFID): The StartRFID message is sent to a TS system to indicate that it should start performing a specific RFID function. If the function is to begin at a certain date or time, the TIME field could contain that information. This field could be used to initialize and start a remote RFID system so that it begins to read tags. As also, as used here this is specific to RFID readers. It should be understood to those skilled in the art, that other reader or detection systems are possible and in such embodiments, other messages can be developed or this message can be adapted for their use. Other systems could include: laser detection, video detection, etc. As such, this message could alternatively be: StartDETECTOR, or StartLASER, or StartVIDEO. by ways of examples.

Packet length=variable size
Total fields=7
StartRFID|FROM|DEST|FUNCTION|TIME|PACKET#|EOM|

Of course those skilled in the art will understand that when other technology is used for the tag reader or participant detection system, this message can be renamed and still be within the scope of the present disclosure.

Stop RFID Message (StopRFID): The StopRFID message is sent to a device to indicate that it should start performing a specific RFID function. If the function is to begin at a certain date or time, the TIME field could contain that information. This field could be used to initialize and start a remote RFID system so that it begins to read tags. Other systems could include: laser detection, video detection, etc. As such, this message could alternatively be: StopDETECTOR, or StopLASER, or StopVIDEO. by ways of examples.

Packet length=variable size
Total fields=7
StopRFID|FROM|DEST|FUNCTION|TIME|PACKET#|EOM|

Of course those skilled in the art will understand that when other technology is used for the tag reader or participant detection system, this message can be renamed and still be within the scope of the present disclosure.

Command Message (COMMAND): The COMMAND message is sent to a TS system to request that a particular command be executed in that TS system. The IDENTIFIER field may contain any text desired. This field could be used to send any tag reader or participant or tag detector command to a remote device. For example, if the current battery charge level on a remote system needed to determined, a Command message could be sent with the text BATTERYSTATS in the IDENTIFIER field. The remote system would need to have functions built in that can process the command.

Packet length=variable size
Total fields=6
COMMAND|FROM|DEST|IDENTIFIER|PACKET#|EOM|

Request Image Message (RQIMAGE): The RQIMAGE message is sent to a device to request that a particular image be returned. The message is useful when interfacing with a system that contains photographs or other pictures such as logos or artwork. The IDENTIFIER field should contain a unique descriptor for the image desired and may contain any text desired. Typically, this field will contain a unique number for a participant in an event. However, the IDENTIFIER could also contain a specific location on a remote system where a file is located. The COMPRESSION field may be used to specify the format of the image to be sent. If higher performance across a network is desired, this field might be used to indicate that High compression is desired. The field may contain any text that is recognized by the system designated as DEST. The PACKETSIZE field should contain a value indicating the maximum packet size to send at one time. Given that most images will contain more data than is able to be sent in a single packet, this field may be used to control packet size, thus tuning the network performance. The PSOCKET field is used when it necessary or desired to have multiple packet streams being sent simultaneously from the DEST. For example, the field could contain 7000 on one packet and 7001 on a different packet to indicate that two streams are being used simultaneously.

Packet length=variable size
Total fields=9
RQIMAGE|FROM|DEST|IDENTIFIER|COMPRESSION|PACKETSI ZE|PSOCKET|PACKET #|EOM|

Image Sent Message (STIMAGE): The STIMAGE message is sent from a system responding to a request for an image, e.g., RQIMAGE. The IDENTIFIER field should contain the unique descriptor for the image that was requested and may contain any text desired. Typically, this field will contain a unique number for a participant in an event. However, the IDENTIFIER could also contain a specific location on a given system where a file is located. The COMPRESSION field indicates the type of compression used on the image when it was sent. If higher performance across a network is desired, this field might be used to indicate that High compression is desired. The PACKETSIZE field should contain a value indicating the length of the portion of the image just sent. Given that most images will contain more data than is able to be sent in a single packet, this field will be used to indicate how many bytes have been sent. The PSOCKET field contains a value indicating which stream the information is being sent on. This may be used when it necessary or desired to have multiple packet streams being sent simultaneously from a system. For example, this field could be used to send individual photos to different computers on a network at the same time.
Packet length=variable size
Total fields=9
STIMAGE|FROM|DEST|IDENTIFIER|COMPRESSION|PACKETSIZE|PSOCKET|PACKET #|EOM|

Request Image Library Contents Message (RQIDIR): The RQIDIR message could be sent to a device to request that the names of all images available be provided for that system. The message is useful when interfacing with a system that contains photographs or other pictures such as logos or artwork. The IDENTIFIER field should contain a unique descriptor for the type of images desired or a filter mask for the names or locations of images. For example, the IDENTIFIER might contain the text entry *, or it might contain a qualifier such as *.JPG is the user only wants to receive a list of images that are in JPG format. Of course other qualifiers may be used for other formats.
Packet length=variable size
Total fields=6
RQDIR|FROM|DEST|IDENTIFIER|PACKET #|EOM|

Image Library Sent Message (STIDIR): The STIDIR message is sent to one or more systems as a response to an RQIDIR message and it includes a list of images available. The FILELIST field will contain a list of images in text format that are available. Each image name will contain a carriage return line feed indicator at the end of the name. If the list has been completely transmitted, a final indicator at the end of the list will include an entry of EOL followed by a carriage return line feed. This indicator means there are no additional packets being sent and the entire list has been provided.
Packet length=variable size
Total fields=6
STDIR|FROM|DEST|FILELIST|PACKET #|EOM|

Request Image Message (RQISTREAMON): The RQIDTREAMON message is by a TS system to request that a particular image stream be enabled for a real-time video feed. The message is useful when interfacing with a system that contains a camera displaying live video. The IDENTIFIER field should contain a unique descriptor for the image stream desired and may contain any text desired. Typically, this field will contain a unique name for a camera or video interface. However, the IDENTIFIER could also contain a specific socket, URL, or other indicator that is a live video stream. The COMPRESSION field may be used to specify the format to be used when sending the video stream. If higher performance across a network is desired, this field might be used to indicate that High compression is desired. The field may contain any text that is recognized by the system designated as DEST. The PACKETSIZE field should contain a value indicating the maximum packet size to send at one time. Since the video stream will contain a great amount of information, the image stream can be deconstructed into small packets that are sent across the network. The PSOCKET field is used when it necessary or desired to have multiple packet streams being sent simultaneously from the DEST. For example, the field could contain 6000 on one packet and 6001 on a different packet to indicate that two streams are being used simultaneously. The TIMEOUT field can be used to indicate how long, in seconds, the stream should be kept alive. If this value is set to 0, the DEST will continue to send the stream until a RQISTREAMOFF message is received.
Packet length=variable size
Total fields=10
RQISTREAMON|FROM|DEST|IDENTIFIER|COMPRESSION|PACKETSIZE|PSOCKET|TIMEOUT|PACKET #|EOM|

Request Image Message (RQISTREAMOFF): The RQISTREAMOFF message is sent by a TS system to a request that a particular image stream be disabled. The IDENTIFIER field should contain a unique descriptor for the stream to be disabled. The PSOCKET field can also be used to identify a particular socket, in the event that multiple streams are being sent at the same time.
Packet length=variable size
Total fields=7
RQISTREAMOFF|FROM|DEST|IDENTIFIER|PSOCKET|PACKET#|EOM|

In other embodiments, the packet formats can vary from that described above and herein and still be within the scope of the present disclosure. For example, some or all of the timing system database fields is sent when most of the packets are sent. In such embodiments, this can allow applications to have all of the data contained in a record in the database.

GPS Wakeup Message (GPSWAKE): The GPSWAKE message is sent to by a TS system to a TS or TRS system or GPS chip to request that a communication session begin related to a GPS read or determination. Receipt of this message by a GPS enabled GPS chip or GPS chip reader system (TRS) to send back parameters for the session in the buffer that sensed and received the GPS data from the GPS chip. The LSOCKET value can be used to identify a unique socket being used for the session. The SETTINGS value is used to request the TS or TRS conform to specific parameters for the session. Once a session is established, the requesting entity will wait for data to show up in the buffer and process it accordingly. Thus, this message is sent to a GPS enabled TRS when setting up a long-term session where GPS read data will trickle in over time, into the Buffer allocated.
Packet length=variable size
Total fields=7
GPSWAKE|FROM|DEST|LSOCKET|SETTINGS|BUFFER|EOM|

GPS Wakeup and Receive Message (GPSRWAKE): The GPSRWAKE message is sent to TS or TRS system or GPS chip to request that a communication session begin with GPS data being returned immediately. This message causes the GPS enabled chip or GPS enabled TRS system to send back GPS location and possibly also the time information in the GPS reader or TRS system having received the message and having had at least one GPS chip being detected by such system. The LSOCKET value can be used to identify a unique socket being used for the session. The SETTINGS value is used to request the TS or TRS system conform to specific parameters for the session. Once the initial data has been received by the requesting entity, the session will remain open and wait for additional data to appear in the buffer of the requested entity. This command differs from the GPSWAKE message since the GPSWAKE does not request data, but only activates the GPS enabled TRS system to wait for the next available GPS read data, when it occurs, e.g., the GPSWAKE message waits for data to show up. In contrast, the GPSRWAKE message requests that all GPS data be sent immediately by the receiving entity, thus clearing the buffer of the receiving entity such as a GPS enabled TRS or the GPS enable chip itself.

Packet length=variable size
Total fields=7
GPSRWAKE|FROM|DEST|LOCKET|SETTINGS|BUFFER|EOM|

GPS Receive Message (GPSRMESS): The GPSRMESS message is sent to TS or TRS system or GPS chip for GPS chip data reading to request that all data be transmitted immediately by the receiving system. This is a stateless message that does not require a session to first be created between the requesting and receiving entities. Therefore, the GPSRMESS message can be used in situations where rapid communications with a GPS or SGOS TRS system requires, such as a verification of a prior read or in a situation the requesting TS system determines from other facts or factors. The LSOCKET value can be used to identify a unique socket being used to receive the data. The SETTINGS value is used to request the TS or TRS system to conform to specific parameters for the data transmission. BUFFER will contain the actual data coming back to the caller.

Packet length=variable size
Total fields=7
GPSRMESS|FROM|DEST|LSOCKET|SETTINGS|BUFFER|EOM|

GPS Re-Send Message (GPSRSMESS): The GPSRSMESS message is sent to a TS or TRS system or GPS chip to request that the data previously sent, be re-transmitted. This message can be used to retrieve data that may have been lost in route from the requested entity (another TS or TRS system or GPS chip) to the requesting entity such as another TS. This is a stateless message that does not require a session to first be created. Thus, it is ideal for rapid communications with a chip or system. The LSOCKET value can be used to identify a unique socket being used to receive the data. The SETTINGS value is used to request the chip or remote system conform to specific parameters for the data transmission. BUFFER will contain the actual data coming back to the caller.

Packet length=variable size
Total fields=7
GPSRSMESS|FROM|DEST|LSOCKET|SETTINGS|BUFFER|EOM|

GPS Waypoint Message (GPSWAYP): The GPSWAYP message is sent to a chip or remote system to request specific data that is based on a specific or range of waypoint values. This is a stateless message that does not require a session to first be created. Thus, it is ideal for rapid communications with a chip or system. The LSOCKET value can be used to identify a unique socket being used to receive the data. The SETTINGS value is used to request the chip or remote system conform to specific parameters for the data transmission. BUFFER will contain the actual data coming back to the caller.

Packet length=variable size
Total fields=7
GPSWAYP|FROM|DEST|LSOCKET|SETTINGS|BUFFER|EOM|

GPS Send Message (GPSSENDS): The GPSSENDS message is sent to another TS or TRS system or GPS chip to transmit GPS data be sent immediately. This message requires you to first create a session. The TSOCKET value can be used to identify a unique socket on the remote system. The SETTINGS value is used to request the chip or remote system conform to specific parameters for the data reception. BUFFER will contain the actual data being sent. The advantage to using the GPSSENDS message is that the remote system will automatically handle error handling for lost messages that did not arrive.

Packet length=variable size
Total fields=7
GPSSENDS|FROM|DEST|LSOCKET|SETTINGS|BUFFER|EOM|

GPS Send Message (GPSSENDC): The GPSSENDC message is sent to a TS or TRS system or GPS chip to transmit data immediately. This message does not require a session. The TSOCKET value can be used to identify a unique socket on the remote system. The SETTINGS value is used to request the chip or remote system conform to specific parameters for the data reception. BUFFER will contain the actual data being sent.

Packet length=variable size
Total fields=7
GPSSENDC|FROM|DEST|LSOCKET|SETTINGS|BUFFER|EOM|

GPS Close Message (GPSCLOSE): The GPSCLOSE message is sent to another TS, or TRS system or GPS chip to inform it that transmissions regarding GPS location data are now over and the sockets being used for GPS location data have been released. The TSOCKET value can be used to identify a unique socket on the remote system. This message is used for sessions that are always open as described above, for example, GPSWAKE, GPSRWAKE.

Packet length=variable size
Total fields=5
GPSCLOSE|FROM|DEST|LSOCKET|EOM|

The GPSSENDC is used to send data to another system, which could be any device including a laptop computer, network file server, or another RFID reader. We also have the GPSSENDS message as well. The only difference is that the GPSSENDS message is used for session-oriented communications where the remote system is able to process packets and look for errors that can cause it to send a message back letting the sender know that the data didn't arrive correctly. The GPSSENDC doesn't require a session and it looks like a UDP datagram and is a connectionless packet. This makes it faster and easier to work with, but it doesn't have any built in error correction.

The buffer field contains information related to the GPS data. In fact, the buffer could also contain RFID information as well. For example, a basic message buffer might have something like the following GPSnumber, Total Satellites, Uptime, Longitude, Latitude, Offset, Current Time, and Elevation. The buffer is free-form text meaning the user can implement their own formatting within the buffer to determine delimiters between the data elements. As an example, a TS might use the # character to designate the end of each field within the buffer. Thus, I might have a packet that has a buffer containing something like: 34.56575#121.456487#18:00:03#0.564#234

Any known GPS receiver ID can also be transmitted with the GIS location data.

In one embodiment, the GPS data is sent without waiting for the remote system to setup a connection socket. This is because in future implementations, we will be using multiple VPN ports to send messages back to ITS or perhaps any other system. Presently, the system here at ITS listens for any and all messages on a common socket. Soon we will allow the user to designate a socket in real-time as they wish to have data sent to a system. The GPSSENDC message will be used for that purpose and when the receiving system collects a packet with the GPSSENDC header, it will parse the buffer to look for specific information regarding the desired communication parameters coming from the sender.

One example, of the waypoint message GPSWAYP, is where there may be a timing point along the course needs to collect data from the chips on the runners and the race has 50,000 participants in it. Now assume this timing point is at mile 5. There will be thousands of runners coming through that timing point very rapidly, thus the density will be very high. If the TS tried to collect every GPS data point from them, it would take a while (relative term) to collect the data for every 2 feet of resolution. During the first part of the race, it is less likely to need or track the runner's position every 2 to 3 feet. Most situations you can have data for every 50 to 100 feet. Thus, this message GPSWAYP allows the TS to tell the chip on the runner that we don't need all of the data, just a portion of it. The communications are much faster that way and we can handle very large densities of runners. The Settings is a free-form field that can be customized by the user. However, it is also possible to send a message such as: GPSWAYP|FROM|DEST|LSOCKET|Res:10|BUFFER|EOM| The value of Res:10 could mean to send us the data point for every 10 seconds from the GPS information collected. Thus, let's say the runner was on the course so far for 20 minutes and this is the first time we are collected the positional data, we will be asking for 6 samples per minute× 20 minutes=120 pieces of data. A GPS receiver can provide data down to 100th of a second and thus if we simply requested all data, we might have thousands of data points and that would take a long time to send from the runner's chip to the timing system. So, the GPSWAYP message allows the TS to decide how much data it will need and this can be change changed in real-time based on the density of runners the TS is seeing from the GPS reads.

The process of sending an acknowledgement could also be added. This could be something like GPSACK: GPSACK|FROM|DEST|LSOCKET|BUFFER|EOM In other embodiments, he process of sending an ACK requires more round trip time, which is not good when dealing with high densities of packets. This is much like the old UDP vs. TCP/IP argument. TCP/IP has the advantage of being a session protocol that has error correction through ACKs. UDP is much faster for sending bulk data because it requires no ACK. For the TS, it may be desirable to dump the location data rapidly to a TRS, LDS or TS without having the overhead of the ACKs. So, I think it would make sense to go ahead and add the ACK message in our spec. Thus, here is the format we will use:

The buffer will contain a response code which will likely be a value of 0 for failure and 1 for success. The TS could also use other values such as 2 or 3 for error handling.

In another embodiment a display system or remote monitoring system may want to display something like a moving map image of where the runner has been. In such embodiments, the remote system can send a GPSRMESS message to a file server or database or computing device that has stored all of the GPS data for one or more participants. When the message is sent over, the buffer will contain identifying data for determining what will be sent back to the requesting system. So, the requesting system, such as Announcer, may have something like the following in the buffer: REQALL-GPSDATA:543. This could mean that system wants all GPS data stored in a database for bib number 543. In other cases, the remote system could also send the following in formation in the buffer: REQTIMERANGEGPSDATA:543 and that might mean to send over all data within a time range for bib 543.

Operating Environment

Figure 10:
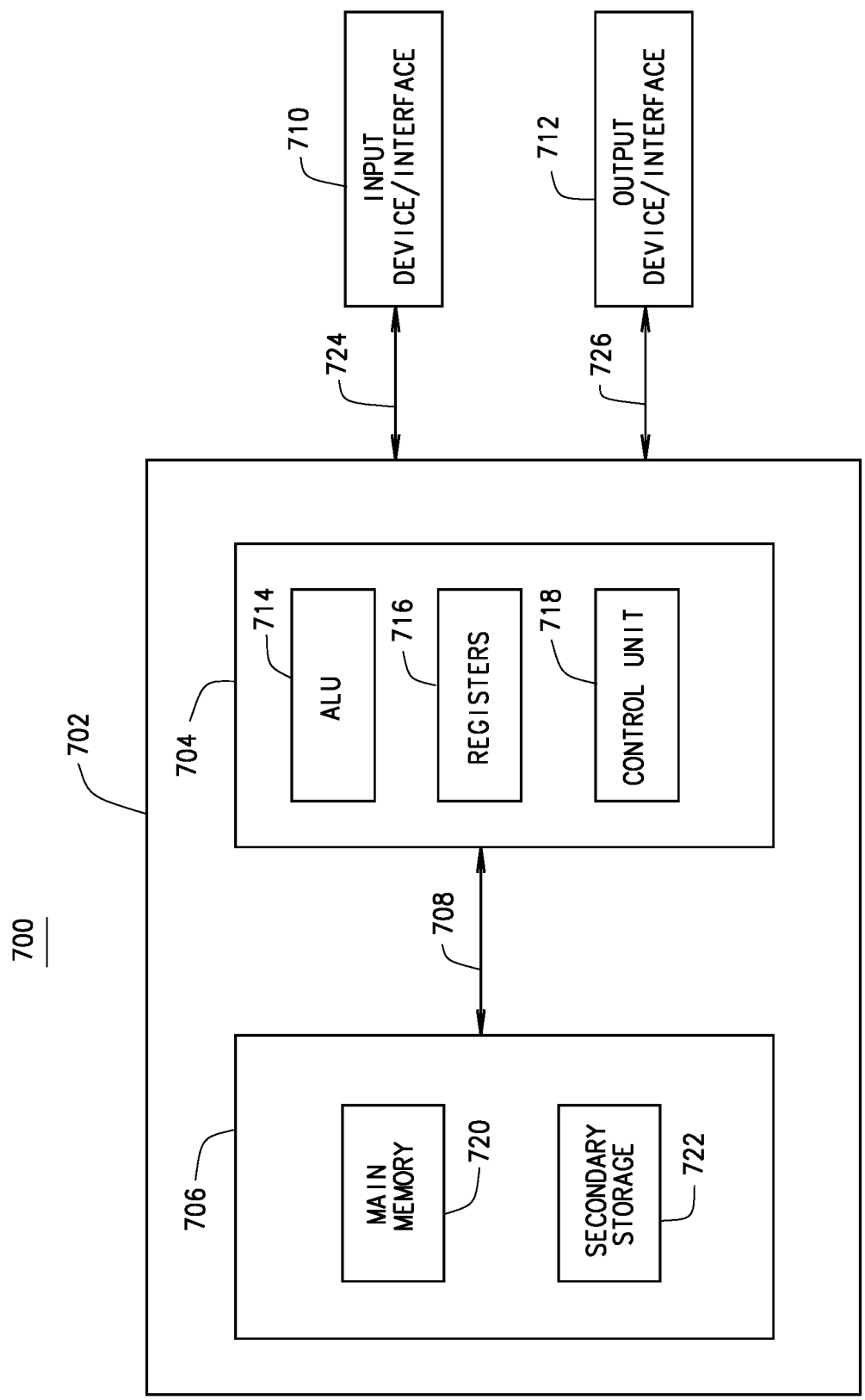
FIG. 10 is a block diagram of a specialized computer system suitable for implementing one or more assembly or methods of various embodiments as described herein.

Referring to FIG. 10, an operating environment for an illustrated embodiment of the TS Location Tracker or TS system is a computer system 700 with a computer 702 that comprises at least one high speed processing unit (CPU) 704, in conjunction with a memory system 706 interconnected with at least one bus structure 708, an input device 710, and an output device 712. These elements are interconnected by at least one bus structure 708. As addressed above, the input and output devices can include a communication interface including an antenna interface.

The illustrated CPU 704 for an RFID semiconductor chip is of familiar design and includes an arithmetic logic unit (ALU) 714 for performing computations, a collection of registers for temporary storage of data and instructions, and a control unit 716 for controlling operation of the computer system 700. Any of a variety of processors, including at least those from Digital Equipment, Sun, MIPS, Motorola, NEC, Intel, Cyrix, AMD, HP, and Nexgen, is equally preferred but not limited thereto, for the CPU 704. The illustrated embodiment of the invention operates on an operating system designed to be portable to any of these processing platforms.

The memory system 706 generally includes high-speed main memory 720 in the form of a medium such as random access memory (RAM) and read only memory (ROM) semiconductor devices that are typical on an RFID semiconductor chip. However, the present disclosure is not limited thereto and can also include secondary storage 722 in the form of long-term storage mediums such as floppy disks, hard disks, tape, CD-ROM, flash memory, etc. and other devices that store data using electrical, magnetic, and optical or other recording media. The main memory 720 also can include, in some embodiments, a video display memory for displaying images through a display device (not shown). Those skilled in the art will recognize that the memory system 706 can comprise a variety of alternative components having a variety of storage capacities.

Where applicable, while not typically provided on RFID tags or chips, an input device 710, and output device 712 can also be provided. The input device 710 can comprise any keyboard, mouse, physical transducer (e.g. a microphone), and can be interconnected to the computer 702 via an input interface 724 associated with the above described communication interface including the antenna interface. The output device 712 can include a display, a printer, a transducer (e.g. a speaker), etc., and be interconnected to the computer 702 via an output interface 726 that can include the above described communication interface including the antenna interface. Some devices, such as a network adapter or a modem, can be used as input and/or output devices.

As is familiar to those skilled in the art, the computer system 700 further includes an operating system and at least one application program. The operating system is the set of software that controls the computer system's operation and the allocation of resources. The application program is the set of software that performs a task desired by the user, using computer resources made available through the operating system. Both are typically resident in the illustrated memory system 706 that may be resident on the RFID semiconductor chip.

In accordance with the practices of persons skilled in the art of computer programming, the present invention is described below with reference to symbolic representations of operations that are performed by the computer system 700. Such operations are sometimes referred to as being computer-executed. It will be appreciated that the operations that are symbolically represented include the manipulation by the CPU 704 of electrical signals representing data bits and the maintenance of data bits at memory locations in the memory system 706, as well as other processing of signals. The memory locations where data bits are maintained are physical locations that have particular electrical, magnetic, or optical properties corresponding to the data bits. The invention can be implemented in a program or programs, comprising a series of instructions stored on a computer-readable medium. The computer-readable medium can be any of the devices, or a combination of the devices, described above in connection with the memory system 706.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A tracking system for determining and tracking a location of a participant tracked during an event along a route with a radio frequency tag having a unique tag number using a timing system communicatively coupled to a radio frequency tag reader system, the radio frequency tag reader system is configured to be located at a fixed location in proximity to the route at a first monitored location point for receiving one or more tag reads from the radio frequency tag as the tracked participant with the radio frequency tag travels in proximity to the first monitored location point, and configured for determining a time for each tag read of the one or more tag reads, identifying the tag number of the radio frequency tag, and transmitting a tag read message including at least a portion of the received tag reads with the tag number and the determined tag read time, the timing system configured for receiving and storing the transmitted tag read message including the tag number and the determined tag read times as transmitted by the radio frequency tag reader system, wherein the participant has a location device configured for associating with the participant and for receiving, from a location signal providing source, a plurality of location data as the participant travels along the route, time stamping each received location data, and transmitting location information including the received plurality of location data and the time stamps over a wireless communication interface, said tracking system comprising:

a location detection device configured to be located at a fixed location in proximity to the route at a second monitored location point and configured to be in wireless communication with the location device and configured for receiving the transmitted location information from the location device, wherein in response to at least the timing system or the radio frequency tag reader system receiving the tag read message, the location detection device transmits the received location information to the timing system;

wherein the timing system stores the location information received by the location detection device including the time stamps and associates the stored location information with the tag number of at least one of the one or more tag reads of the received tag read message as a function of the tag read times and the time stamps of the location information, the timing system determining a plurality of tracked locations of the participant along the route of the event as a function of the plurality of location data and time stamps provided by the location information that is associated with the tag number for the participant.

2. The tracking system of claim 1 wherein the location device is configured to include the tag number of the associated radio frequency tag for the participant and the location information includes the tag number.

3. The tracking system of claim 1 wherein the location device is configured for storing location data in a memory at intervals based on a predetermined rate.

4. The tracking system of claim 1 wherein the location device and the radio frequency tag are each carried on a body part of the participant, and wherein the location device is not communicatively coupled to the radio frequency tag.

5. The tracking system of claim 1 wherein the location device is configured to receive a location data download request from the location detection device based on a download location command, and wherein the location device is configured to transmit the location information to the location detection device responsive to said received location download request.

6. The tracking system of claim 1 wherein the location device is configured to only transmit the received location data responsive to the location detection device receiving an input that a transmission to the location detection device is currently available.

7. The tracking system of claim 1 wherein the timing system is configured to transmit to a remote system, before, during and after the event the plurality of tracked locations associated with a particular tag number responsive to the timing system receiving a request for participant specific location data that includes the particular tag number from the remote system.

8. The tracking system of claim 1 wherein the location device is configured for selective activation and deactivation of a wireless location data receiver, and wherein a wireless communication interface of the location device is configured to receive activation and deactivation commands, and wherein the location detection device is configured for transmitting the activation and deactivation commands responsive to a message received from the timing system.

9. The tracking system of claim 1 wherein the location detection device is configured to transmit to the location device a location data request requesting all or a portion of the stored location data from the location device when the location device is configured to be in proximity to the location detection device, and wherein the location device is configured to transmit the requested location data responsive to the received location data request.

10. The tracking system of claim 1 wherein the location providing source is a plurality of global positioning system (GPS) satellites and wherein the location data is GPS position data.

11. The tracking system of claim 1 wherein the location providing source is a plurality of wireless transmitters from a cellular network, and wherein the location data is cellular triangulation position data.

12. A method for determining and tracking a location of a participant traveling along a route during an event, wherein the participant being tracked with a radio frequency tag using a timing system communicatively coupled to a radio frequency tag reader system, the radio frequency tag reader system configured to be located at a fixed location in proximity to the route at a first monitored location point for receiving one or more tag reads from the radio frequency tag as the tracked participant with the radio frequency tag travels in proximity to the first monitored location point, and configured for determining a time for each tag read of the one or more tag reads, identifying the tag number of the radio frequency tag, and transmitting a tag read message including at least a portion of the received tag reads with the tag number and the determined tag read time, the timing system configured for receiving and storing the transmitted tag read message including the tag number and the determined tag read times as transmitted by the radio frequency tag reader system, the method for use with a location device that is configured to be associated with the radio frequency tag of the participant and configured for:
 receiving a plurality of location data from a location providing source;
 time stamping each received location data; and
 transmitting location data including the time stamps, the method comprising:
 in a location detection device configured to be located at a fixed location in proximity to the route at a second monitored location point and in wireless communication with the location device:
 receiving the transmitted location data; and
 in response to at least the timing system or the radio frequency tag reader system receiving the tag read message, transmitting the received location data to the timing system; in the timing system:
 receiving the location data including the plurality of location data and time stamps;
 associating the location data with the tag number as provided by the radio frequency tag reader system from at least one of the tag reads from the radio frequency tag associated with the location device;
 determining a plurality of tracked locations of the participant along the route of the event as a function of the plurality of location data and time stamps provided by the location information that is associated with the tag number for the participant; and
 storing the plurality of location data associated with the tag number.

13. The method of claim 12 wherein in the location device, the storing of location data is at intervals based on a predetermined rate.

14. The method of claim 12 wherein in the location device, receiving a location data download request, and transmitting the location data to a location detection device is configured to be responsive to said request.

15. The method of claim 12, wherein in at least one of the timing system and the radio frequency tag reader system:
 detecting a proximity of the radio frequency tag to the radio frequency tag reader system; and
 transmitting a location data download command to the location detection device, wherein in the location detection device, transmitting the location data download request to the location device.

16. The method of claim 12 wherein in the location detection device, the transmitting is only responsive to the location detection device receiving an input that a transmission to the location detection device is currently available.

17. The method of claim 12 wherein in the timing system, transmitting the location data associated with a particular tag number responsive to a request from a remote system.

18. The method of claim 12, wherein in a remote system selected from the group consisting of a Kiosk, a website, a mobile phone, a mobile computing device, a portable computer, a tablet, a watch, a news station, or a broadcast network;
 requesting location data from the timing system for the particular tag number; and
 receiving the requested location data, wherein the requested location data comprises the plurality of tracked locations as transmitted by the timing system, and displaying the plurality of tracked locations as transmitted by the timing system on a display map of the route indicating the route traveled by the participant associated with the particular tag number or a most recent and current location of the participant associated with the particular tag number.

19. The method of claim 12, wherein in the location detection device:
 transmitting at least one of an activation and a deactivation command responsive to a message received from the timing system; and
 wherein in the location device:
 selectively activating and deactivating a location data receiver responsive to receipt of the message from the location detection device.

20. The method of claim 12, wherein in the location detection device:
 at least one of transmitting to the location device a location data request requesting all or a portion of the location data from the location device and transmitting a dump all data command and then transmitting a clear all data command, and
 wherein in the location device:
 at least one of transmitting the location data responsive to the location data request and transmitting all of the location data responsive to the receipt of the dump all data command and clearing a memory of all location data responsive to receiving the clear all data command.

* * * * *